(12) United States Patent
Sequeira, Jr. et al.

(10) Patent No.: US 9,864,098 B2
(45) Date of Patent: Jan. 9, 2018

(54) METHOD AND SYSTEM OF INTERACTIVE DRILL CENTER AND WELL PLANNING EVALUATION AND OPTIMIZATION

(71) Applicants: Jose J. Sequeira, Jr., The Woodlands, TX (US); Yao-Chou Cheng, Houston, TX (US); Rune Musum, Stavanger (NO)

(72) Inventors: Jose J. Sequeira, Jr., The Woodlands, TX (US); Yao-Chou Cheng, Houston, TX (US); Rune Musum, Stavanger (NO)

(73) Assignee: ExxonMobil Upstream Research Company, Spring, TX (US)

( * ) Notice: Subject to any disclaimer, the term of this patent is extended or adjusted under 35 U.S.C. 154(b) by 770 days.

(21) Appl. No.: 14/461,183

(22) Filed: Aug. 15, 2014

(65) Prior Publication Data

US 2015/0094994 A1   Apr. 2, 2015

Related U.S. Application Data

(60) Provisional application No. 61/884,701, filed on Sep. 30, 2013.

(51) Int. Cl.
*G06G 7/48* (2006.01)
*G01V 99/00* (2009.01)

(52) U.S. Cl.
CPC ...... *G01V 99/005* (2013.01); *G01V 2210/667* (2013.01)

(58) Field of Classification Search
None
See application file for complete search history.

(56) References Cited

U.S. PATENT DOCUMENTS 4,794,534 A    12/1988   Millheim
5,468,088 A    11/1995   Shoemaker et al.
(Continued)

FOREIGN PATENT DOCUMENTS

WO    2000/14574    3/2000

OTHER PUBLICATIONS

Bharat, K, et al. (2001), "Who Links to Whom: Mining Linkage Between Web sites", *Proceedings of the 2001 IEE Int'l Conf. on Data Mining*, pp. 51-58.

(Continued)

*Primary Examiner* — Omar Fernandez Rivas
*Assistant Examiner* — Nithya J Moll
(74) *Attorney, Agent, or Firm* — ExxonMobil Upstream Research Company—Law Department

(57) ABSTRACT

A method, including: identifying a well target or reservoir segment; defining a dynamic surface grid, the dynamic surface grid being a representation of a ground surface, sea-level, or subsea surface above a reservoir upon which a drill center is locatable, and the dynamic surface grid including a plurality of cells that define potential locations for the drill center; assigning, to each of the plurality of cells of the dynamic surface grid, a value of a drilling or geologic attribute that defines a quality of a drill center position relative to the well target or reservoir segment; and selecting, based on a value of the drilling or geologic attribute, a location for the drill center corresponding to a location represented on the dynamic surface grid.

46 Claims, 15 Drawing Sheets

(56) References Cited

U.S. PATENT DOCUMENTS

| | | |
|---|---|---|
| 5,708,764 A | 1/1998 | Borrel et al. |
| 5,905,657 A | 5/1999 | Celniker |
| 5,992,519 A | 11/1999 | Ramakrishman et al. |
| 6,002,985 A | 12/1999 | Stephenson |
| 6,035,255 A | 3/2000 | Murphy et al. |
| 6,044,328 A | 3/2000 | Murphy et al. |
| 6,049,758 A | 4/2000 | Bunks et al. |
| 6,070,125 A | 5/2000 | Murphy et al. |
| 6,101,447 A | 8/2000 | Poe, Jr. |
| 6,219,061 B1 | 4/2001 | Lauer et al. |
| 6,236,942 B1 | 5/2001 | Bush |
| 6,236,994 B1 | 5/2001 | Swartz et al. |
| 6,353,677 B1 | 3/2002 | Pfister et al. |
| 6,373,489 B1 | 4/2002 | Lu et al. |
| 6,438,069 B1 | 8/2002 | Ross et al. |
| 6,490,528 B2 | 12/2002 | Cheng et al. |
| 6,516,274 B2 | 2/2003 | Cheng et al. |
| 6,519,568 B1 | 2/2003 | Harvey et al. |
| 6,529,833 B2 | 3/2003 | Fanini et al. |
| 6,549,854 B1 | 4/2003 | Malinverno et al. |
| 6,549,879 B1 | 4/2003 | Cullick et al. |
| 6,612,382 B2 | 9/2003 | King |
| 6,643,656 B2 | 11/2003 | Peterson |
| 6,715,551 B2 | 4/2004 | Curtis et al. |
| 6,757,613 B2 | 6/2004 | Chapman et al. |
| 6,765,570 B1 | 7/2004 | Cheung et al. |
| 6,766,254 B1 | 7/2004 | Bradford et al. |
| 6,772,066 B2 | 8/2004 | Cook |
| 6,823,266 B2 | 11/2004 | Czernuszenko et al. |
| 6,823,732 B2 | 11/2004 | Corghi |
| 6,826,483 B1 | 11/2004 | Anderson et al. |
| 6,829,570 B1 | 12/2004 | Thambynayagam et al. |
| 6,912,467 B2 | 6/2005 | Schuette |
| 6,912,468 B2 | 6/2005 | Marin et al. |
| 6,978,210 B1 | 12/2005 | Suter et al. |
| 6,980,939 B2 | 12/2005 | Dhir et al. |
| 6,980,940 B1 | 12/2005 | Gurpinar et al. |
| 6,993,434 B2 | 1/2006 | Cheng et al. |
| 7,003,439 B2 | 2/2006 | Aldred et al. |
| 7,027,925 B2 | 4/2006 | Terentyev et al. |
| 7,031,842 B1 | 4/2006 | Musat et al. |
| 7,035,255 B2 | 4/2006 | Tzeng |
| 7,047,170 B2 | 5/2006 | Feldman et al. |
| 7,050,953 B2 | 5/2006 | Chiang et al. |
| 7,054,752 B2 | 5/2006 | Zabalza-Mezghani et al. |
| 7,079,953 B2 | 7/2006 | Thorne et al. |
| 7,085,696 B2 | 8/2006 | King |
| 7,089,167 B2 | 8/2006 | Poe |
| 7,096,172 B2 | 8/2006 | Colvin et al. |
| 7,098,908 B2 | 8/2006 | Acosta et al. |
| 7,109,717 B2 | 9/2006 | Constable |
| 7,136,064 B2 | 11/2006 | Zuiderveld |
| 7,181,380 B2 | 2/2007 | Dusterhoft et al. |
| 7,203,342 B2 | 4/2007 | Pedersen |
| 7,225,078 B2 | 5/2007 | Shelley et al. |
| 7,248,258 B2 | 7/2007 | Acosta et al. |
| 7,278,496 B2 | 10/2007 | Leuchtenberg |
| 7,280,932 B2 | 10/2007 | Zoraster et al. |
| 7,281,213 B2 | 10/2007 | Callegari |
| 7,283,941 B2 | 10/2007 | Horowitz et al. |
| 7,298,376 B2 | 11/2007 | Chuter |
| 7,314,588 B2 | 1/2008 | Blankenship |
| 7,328,107 B2 | 2/2008 | Strack et al. |
| 7,330,791 B2 | 2/2008 | Kim et al. |
| 7,337,067 B2 | 2/2008 | Sanstrom |
| 7,340,347 B2 | 3/2008 | Shray et al. |
| 7,343,275 B2 | 3/2008 | Roland et al. |
| 7,362,329 B2 | 4/2008 | Zuiderveld |
| 7,363,866 B2 | 4/2008 | Gnedenko et al. |
| 7,366,616 B2 | 4/2008 | Bennett et al. |
| 7,367,411 B2 | 5/2008 | Leuchtenberg |
| 7,395,252 B2 | 7/2008 | Anderson et al. |
| 7,409,438 B2 | 8/2008 | McConnell et al. |
| 7,412,363 B2 | 8/2008 | Callegari |
| 7,437,358 B2 | 10/2008 | Arrouye et al. |
| 7,451,066 B2 | 11/2008 | Edwards et al. |
| 7,458,062 B2 | 11/2008 | Coulthard et al. |
| 7,460,957 B2 | 12/2008 | Prange et al. |
| 7,478,024 B2 | 1/2009 | Gurpinar et al. |
| 7,512,543 B2 | 3/2009 | Raghuraman et al. |
| 7,519,976 B2 | 4/2009 | Blevins |
| 7,539,625 B2 | 5/2009 | Klumpen et al. |
| 7,548,873 B2 | 6/2009 | Veeningen et al. |
| 7,565,243 B2 | 7/2009 | Kim et al. |
| 7,576,740 B2 | 8/2009 | Dicken |
| 7,596,481 B2 | 9/2009 | Zamora et al. |
| 7,603,264 B2 | 10/2009 | Zamora et al. |
| 7,606,666 B2 | 10/2009 | Repin et al. |
| 7,616,213 B2 | 11/2009 | Chuter |
| 7,620,534 B2 | 11/2009 | Pita et al. |
| 7,627,430 B2 | 12/2009 | Hawtin |
| 7,630,914 B2 | 12/2009 | Veeningen et al. |
| 7,652,779 B2 | 1/2010 | Wu et al. |
| 7,657,407 B2 | 2/2010 | Logan |
| 7,657,414 B2 | 2/2010 | Zamora et al. |
| 7,657,494 B2 | 2/2010 | Wilkinson et al. |
| 7,668,700 B2 | 2/2010 | Erignac et al. |
| 7,672,826 B2 | 3/2010 | Chen et al. |
| 7,684,929 B2 | 3/2010 | Prange et al. |
| 7,711,550 B1 | 5/2010 | Feinberg et al. |
| 7,716,028 B2 | 5/2010 | Montaron et al. |
| 7,716,029 B2 | 5/2010 | Couet et al. |
| 7,725,302 B2 | 5/2010 | Ayan et al. |
| 7,739,089 B2 | 6/2010 | Gurpinar et al. |
| 7,743,006 B2 | 6/2010 | Woronow et al. |
| 7,752,022 B2 | 7/2010 | Fornel et al. |
| 7,778,811 B2 | 8/2010 | Kelfoun |
| 7,796,468 B2 | 9/2010 | Kellogg |
| 7,814,989 B2 | 10/2010 | Nikolakis-Mouchas et al. |
| 7,876,705 B2 | 1/2011 | Gurpinar et al. |
| 7,878,268 B2 | 2/2011 | Chapman et al. |
| 7,886,285 B2 | 2/2011 | Asselin et al. |
| 7,899,657 B2 | 3/2011 | Martin |
| 7,913,190 B2 | 3/2011 | Grimaud et al. |
| 7,925,483 B2 | 4/2011 | Xia et al. |
| 7,925,695 B2 | 4/2011 | McConnell et al. |
| 7,953,585 B2 | 5/2011 | Gurpinar et al. |
| 7,953,587 B2 | 5/2011 | Bratton et al. |
| 7,970,545 B2 | 6/2011 | Sanstrom |
| 7,986,319 B2 | 7/2011 | Dommisse et al. |
| 7,991,600 B2 | 8/2011 | Callegari |
| 7,995,057 B2 | 8/2011 | Chuter |
| 8,005,658 B2 | 8/2011 | Tilke et al. |
| 8,044,602 B2 | 10/2011 | Smith |
| 8,055,026 B2 | 11/2011 | Pedersen |
| 8,064,684 B2 | 11/2011 | Ratti et al. |
| 8,073,664 B2 | 12/2011 | Schottle et al. |
| 8,103,493 B2 | 1/2012 | Sagert et al. |
| 8,145,464 B2 | 3/2012 | Amegaard et al. |
| 8,155,942 B2 | 4/2012 | Sarma et al. |
| 8,199,166 B2 | 6/2012 | Repin et al. |
| 8,204,728 B2 | 6/2012 | Schottle et al. |
| 8,249,844 B2 | 8/2012 | Dale et al. |
| 8,259,126 B2 | 9/2012 | Chuter |
| 8,280,635 B2 | 10/2012 | Ella et al. |
| 8,296,720 B2 | 10/2012 | Coulthard et al. |
| 8,301,426 B2 | 10/2012 | Abasov et al. |
| 8,325,179 B2 | 12/2012 | Murray et al. |
| 8,346,695 B2 | 1/2013 | Pepper et al. |
| 8,364,404 B2 | 1/2013 | Legendre et al. |
| 8,381,815 B2 | 2/2013 | Karanikas et al. |
| 8,427,904 B2 | 4/2013 | Miller et al. |
| 8,392,163 B2 | 5/2013 | Liu |
| 8,560,476 B2 | 10/2013 | Anderson et al. |
| 8,578,000 B2 | 11/2013 | Van Wie et al. |
| 8,598,882 B2 | 12/2013 | Meekes |
| 8,638,328 B2 | 1/2014 | Lin |
| 8,727,017 B2 | 5/2014 | Hilliard et al. |
| 8,731,872 B2 | 5/2014 | Czernuszenko et al. |
| 8,731,873 B2 | 5/2014 | Walker et al. |
| 8,731,875 B2 | 5/2014 | Hilliard et al. |
| 8,736,600 B2 | 5/2014 | Lin et al. |
| 8,751,208 B2 | 6/2014 | Brouwer et al. |
| 8,797,319 B2 | 8/2014 | Lin |

(56) References Cited

U.S. PATENT DOCUMENTS

| | | |
|---|---|---|
| 8,803,878 B2 | 8/2014 | Andersen et al. |
| 8,812,334 B2 | 8/2014 | Givens et al. |
| 8,849,639 B2 | 9/2014 | Brown et al. |
| 8,849,640 B2 | 9/2014 | Holl et al. |
| 8,868,540 B2 | 10/2014 | Ture et al. |
| 8,931,580 B2 | 1/2015 | Cheng et al. |
| 9,020,793 B2 | 4/2015 | Kumar et al. |
| 9,047,689 B2 | 6/2015 | Stolte et al. |
| 9,123,161 B2 | 9/2015 | Adair et al. |
| 2002/0049575 A1 | 4/2002 | Jalali et al. |
| 2002/0067373 A1 | 6/2002 | Roe et al. |
| 2002/0177955 A1 | 11/2002 | Jalali et al. |
| 2003/0072907 A1 | 4/2003 | Lerner et al. |
| 2003/0078794 A1 | 4/2003 | Knapp |
| 2004/0012670 A1 | 1/2004 | Zhang |
| 2004/0207652 A1 | 10/2004 | Ratti et al. |
| 2004/0268338 A1 | 12/2004 | Gurpinar et al. |
| 2005/0119959 A1 | 6/2005 | Eder |
| 2005/0171700 A1 | 8/2005 | Dean |
| 2005/0199391 A1 | 9/2005 | Cudmore et al. |
| 2006/0085174 A1 | 4/2006 | Hemanthkumar et al. |
| 2006/0224423 A1 | 10/2006 | Sun et al. |
| 2006/0247903 A1 | 11/2006 | Schottle |
| 2006/0265508 A1 | 11/2006 | Angel et al. |
| 2007/0076044 A1 | 4/2007 | Corley, Jr. et al. |
| 2007/0088707 A1 | 4/2007 | Durgin et al. |
| 2007/0100703 A1 | 5/2007 | Noda |
| 2007/0156340 A1 | 7/2007 | Shray et al. |
| 2007/0199721 A1 | 8/2007 | Givens et al. |
| 2007/0185696 A1 | 9/2007 | Moran et al. |
| 2007/0213935 A1 | 9/2007 | Fagnou et al. |
| 2007/0266082 A1 | 11/2007 | McConnell et al. |
| 2007/0294034 A1 | 12/2007 | Bratton et al. |
| 2008/0088621 A1 | 4/2008 | Grimaud et al. |
| 2008/0109490 A1 | 5/2008 | Arnegaard et al. |
| 2008/0120076 A1 | 5/2008 | Thambynayagam et al. |
| 2008/0165185 A1 | 7/2008 | Smith et al. |
| 2008/0165186 A1 | 7/2008 | Lin |
| 2008/0243749 A1 | 10/2008 | Pepper et al. |
| 2008/0297510 A1 | 12/2008 | Callegari |
| 2008/0306803 A1 | 12/2008 | Vaal et al. |
| 2009/0027380 A1 | 1/2009 | Rajan et al. |
| 2009/0027385 A1 | 1/2009 | Smith |
| 2009/0037114 A1 | 2/2009 | Peng et al. |
| 2009/0043507 A1 | 2/2009 | Dommissee et al. |
| 2009/0070086 A1 | 3/2009 | Le Ravalec et al. |
| 2009/0089028 A1 | 4/2009 | Sagert et al. |
| 2009/0125362 A1 | 5/2009 | Reid et al. |
| 2009/0132170 A1 | 5/2009 | Krueger et al. |
| 2009/0157367 A1 | 6/2009 | Meyer et al. |
| 2009/0157590 A1 | 6/2009 | Mijares et al. |
| 2009/0182541 A1 | 7/2009 | Crick et al. |
| 2009/0198447 A1 | 8/2009 | Legendre et al. |
| 2009/0200014 A1 | 8/2009 | Dommisse et al. |
| 2009/0205819 A1 | 8/2009 | Dale et al. |
| 2009/0222742 A1 | 9/2009 | Pelton et al. |
| 2009/0229819 A1 | 9/2009 | Repin et al. |
| 2009/0240564 A1 | 9/2009 | Boerries et al. |
| 2009/0295792 A1 | 12/2009 | Liu et al. |
| 2009/0299709 A1 | 12/2009 | Liu |
| 2009/0303233 A1 | 12/2009 | Lin et al. |
| 2009/0319243 A1 | 12/2009 | Suarez-Rivera et al. |
| 2010/0013831 A1 | 1/2010 | Gilje et al. |
| 2010/0053161 A1 | 3/2010 | Chuter |
| 2010/0125349 A1 | 5/2010 | Abasov et al. |
| 2010/0132450 A1 | 6/2010 | Pomerantz et al. |
| 2010/0161292 A1 | 6/2010 | Shook et al. |
| 2010/0161300 A1 | 6/2010 | Yeten et al. |
| 2010/0169018 A1 | 7/2010 | Brooks |
| 2010/0171740 A1 | 7/2010 | Andersen et al. |
| 2010/0172209 A1 | 7/2010 | Miller et al. |
| 2010/0174489 A1 | 7/2010 | Bryant et al. |
| 2010/0179797 A1 | 7/2010 | Cullick et al. |
| 2010/0185395 A1 | 7/2010 | Pirovolou et al. |
| 2010/0191516 A1* | 7/2010 | Benish ............... E21B 43/00 703/10 |
| 2010/0206559 A1 | 8/2010 | Sequeira, Jr. et al. |
| 2010/0214870 A1 | 8/2010 | Pepper et al. |
| 2010/0225642 A1 | 9/2010 | Murray et al. |
| 2010/0271232 A1 | 10/2010 | Clark et al. |
| 2010/0283788 A1 | 11/2010 | Rothnemer et al. |
| 2010/0286917 A1 | 11/2010 | Hazlett et al. |
| 2010/0299125 A1 | 11/2010 | Ding et al. |
| 2010/0307742 A1 | 12/2010 | Philips et al. |
| 2011/0022435 A1 | 1/2011 | Reid et al. |
| 2011/0157235 A1 | 1/2011 | FitzSimmons |
| 2011/0029293 A1 | 2/2011 | Petty et al. |
| 2011/0040533 A1 | 2/2011 | Torrens et al. |
| 2011/0040536 A1 | 2/2011 | Levitan |
| 2011/0044532 A1 | 2/2011 | Holl et al. |
| 2011/0054857 A1 | 3/2011 | Moguchaya |
| 2011/0060572 A1 | 3/2011 | Brown et al. |
| 2011/0063292 A1 | 3/2011 | Holl et al. |
| 2011/0074766 A1 | 3/2011 | Page et al. |
| 2011/0099547 A1 | 4/2011 | Banga |
| 2011/0106514 A1 | 5/2011 | Omeragic et al. |
| 2011/0107246 A1 | 5/2011 | Vik |
| 2011/0109633 A1 | 5/2011 | Sequeira, Jr. et al. |
| 2011/0112802 A1 | 5/2011 | Wilson et al. |
| 2011/0115787 A1 | 5/2011 | Kadlee |
| 2011/0126192 A1 | 5/2011 | Frost et al. |
| 2011/0153300 A1* | 6/2011 | Holl ............... E21B 47/022 703/10 |
| 2011/0161133 A1 | 6/2011 | Staveley et al. |
| 2011/0168391 A1 | 7/2011 | Saleri et al. |
| 2011/0175899 A1 | 7/2011 | Bittar et al. |
| 2012/0137281 A1 | 5/2012 | Kleiner et al. |
| 2012/0150449 A1 | 6/2012 | Dobin |
| 2012/0166166 A1 | 6/2012 | Czernuszenko |
| 2012/0285701 A1* | 11/2012 | Cheng ............... E21B 43/30 166/369 |
| 2013/0112407 A1 | 5/2013 | Cheng et al. |
| 2013/0140037 A1 | 6/2013 | Sequeira, Jr. et al. |
| 2013/0317798 A1 | 11/2013 | Cheng et al. |
| 2013/0338984 A1 | 12/2013 | Braaksma et al. |
| 2013/0338987 A1 | 12/2013 | Cheng et al. |
| 2014/0278117 A1 | 9/2014 | Dobin et al. |
| 2014/0365192 A1 | 12/2014 | Cheng et al. |
| 2015/0049084 A1 | 2/2015 | Cheng et al. |
| 2015/0094994 A1 | 4/2015 | Sequeira, Jr. et al. |
| 2016/0003008 A1 | 1/2016 | Uribe et al. |

OTHER PUBLICATIONS

Cabral, B., et al (1995), "Accelerated Volume Rendering and Tomographic Reconstruction Using Texture Mapping Hardware", *IEEE in Symposium on Volume Visualization*, pp. 91-98, 131.

Crawfis, R., et al. (1992), "Direct Volume Visualization of Three-Dimensional Vector Fields", *Proceedings of the 1992 Workshop on Volume Visualization*, pp. 55-60.

Drebin, R., et al. (1988), "Volume Rendering", *Computer Graphics, the Proceedings of 1988 SIGGRAPH Conference*, vol. 22, No. 4, pp. 65-74.

Lorensen, W., et al., (1987), "Marching Cubes: A High-Resolution 3D Surface Construction Algorithm", *Computer Graphics, The Proceeding of 1987 SIGGRAPH Conference*, vol. 21, No. 4, pp. 163-169.

McCann, P., et al. (2003), "Horizontal Well Path Planning and Correction Using Optimization Techniques," *J. of Energy Resources Tech.* 123, pp. 187-193.

Rainaud, J.F., et al. (2004), "WOG—Well Optimization by Geosteering: A Pilot Software for Cooperative Modeling on Internet," *Oil & Gas Science & Tech.* 59(4), pp. 427-445.

Reed, P., et al. (2003) "Simplifying Multiobjective Optimization Using Genetic Algorithms," Proceedings of World Water and Environmental Resources Congress, 10 pgs.

Udoh, E., et al. (2003), "Applicatons of Strategic Optimization Techniques to Development and Management of Oil and Gas Resources", 27$^{th}$ SPE Meeting, 16 pgs.

(56) References Cited

OTHER PUBLICATIONS

Mugerin. C., et al. (2002), "Well Design Optimization: Implementation in GOCAD," $22^{nd}$ Gocad Meeting, Jun. 2002 pp. 1-14.

Yuen, B.B.W., et al. (2011) "Optimizing Development Well Placements Within Geological Uncertainty Utilizing Sector Models" SPE 148017. Paper prepared for presentation at the SPE Reservoir Characterization and Simulation Conference and Exhibition held in Abu Dhabi, UAE, Oct. 9-11, 2011.

\* cited by examiner

Step 1001

Definition of the Dynamic Surface Grid Which is the Representation of the Ground Surface/Sea Level/Sub-Sea Area Upon Which a Drill Center Will be Located. Each Cell Center of the DSG Could Potentially be the Location of an Optimal Drill Center Location.

Step 1002

Select the Suite of Well Targets and/or Reservoir Segments Through One or More Reservoir Intervals. Define Acceptable Drilling Parameters for Well Paths to Intersect the Targets/Segments.

Step 1003

Define a Set of Calculated Attributes to Use in the Optimization Process. For Each Attribute, a Value Will be Calculated and Assigned to a DSG Cell Center. Attributes Could Include Measured Depth, Accumulated Dogleg Severity (DLS), Drilling Difficulty Index (DDI), Cost Criteria, Reservoir Performation, etc. Attributes Could be Calculated for Each Well Path, Each Well Target or Reservoir Segment and Each Drill Center Location. The Generated Attribute Values are Assigned to a DSG Cell Center Which Represents a Potential Drill Center Location.

Step 1004

Based on the Individual DSG Attributes or a Composite of Several DSG Attributes, Potential Drill Center Locations are Highgraded and Optimized.

Step 1005

Areas of the DSG are Refined to Fine Tune the Placement of a Single Drill Center or Multiple Drill Centers. Individual Well Targets or Reservoir Segments are Adjusted to Satisfy Drilling Constraints and/or Numbers of Drill Centers are Varied to Test Various Scenarios.

Step 1006

The Inventive Method is Re-Run and Further Refinement Continues Until a Satisfactory Drill Center Optimized Solution is Obtained

FIG. 10

METHOD AND SYSTEM OF INTERACTIVE DRILL CENTER AND WELL PLANNING EVALUATION AND OPTIMIZATION

CROSS-REFERENCE TO RELATED APPLICATION

This application claims the benefit of U.S. Provisional Patent Application 61/884,701 filed Sep. 30, 2013 entitled METHOD AND SYSTEM OF INTERACTIVE DRILL CENTER AND WELL PLANNING EVALUATION AND OPTIMIZATION, the entirety of which is incorporated by reference herein.

FIELD OF THE INVENTION

The present disclosure describes a system and method for drill center placement, along with well planning and optimization of drilling operations.

BACKGROUND

Development drilling for field depletion planning involves optimization of a wide variety of parameters including drill center location(s), drill center slot design and assignment, reservoir target location(s), well trajectory and shallow hazard avoidance all while minimizing drilling cost and risk. These wide varieties of factors are often in conflict when finalizing well paths and drill center locations. Current field planning and drill center design practices are often sequential and inefficient for these various reasons.

For example:
1. Geoscientists select potential target locations based on the geologic interpretation and understanding of the distribution of subsurface reservoir properties.
2. Multiple well trajectories are designed to penetrate favorable reservoir properties and given to the drilling engineer for more detailed well design and analysis.
3. Drill center locations are selected or modified based on the analysis of these well designs.
4. Because of the complexity of the well paths and reservoir requirements, tradeoffs to the target location(s), number of targets, basic trajectory parameters and drill center locations need to be made.
5. The final drill center locations and well trajectories may take multiple trial and error iterations and still may not yield the optimal solution.

The length of time taken to iterate between drill center and target locations can limit the number of scenarios examined and lead to sub-optimal results.

Drilling operations require complex steps and processes in order to derive maximum return with minimum cost. At the same time, the well site selection also needs to consider the environmental impact. Drill center selection and well plan optimization processes usually derive an 'optimal' solution that is based on certain rigid constraints. The end result of the process provides limited choices and little insight into the solution space to the user. In order to obtain a different 'optimal' solution, the users would experiment by modifying certain parameters in the optimization process.

SUMMARY

A method, including: identifying a well target or reservoir segment; defining a dynamic surface grid, the dynamic surface grid being a representation of a ground surface, sea-level, or subsea surface above the reservoir upon which a drill center is locatable, and the dynamic surface grid including a plurality of cells that define potential locations for the drill center; assigning, to each of the plurality of cells of the dynamic surface grid, a value of a drilling or geologic attribute that defines a quality of a drill center position relative to the well target or reservoir segment; and selecting, based on a value of the drilling or geologic attribute, a location for the drill center corresponding to a location represented on the dynamic surface grid.

The method can further include: creating a first attribute map with a first drilling or geologic attribute in combination with a first well target or reservoir segment; creating a second attribute map with the first drilling or geologic attribute in combination with a second well target or reservoir segment in the reservoir; and creating a first composite attribute map by combining the first attribute map and the second attribute map.

The drilling or geologic attribute can be measured depth, and the method can further include: determining a well trajectory solution from each of the plurality of cells, which define potential locations for the drill center, to the well target or reservoir segment; and calculating a measured depth of each of the well trajectory solutions, wherein the assigning includes assigning corresponding values of the measured depth to each of the plurality of cells that define potential locations for the drill center.

The method can further include: creating a composite attribute map from a combination of a first attribute map based on a first drilling or geologic attribute and a second attribute map based on a second drilling or geologic attribute, the first drilling or geologic attribute being different from the second drilling or geologic attribute.

The method can further include, after the assigning and before the selecting: identifying a region on the dynamic surface grid that is less than an entirety of the dynamic surface grid; and creating a nested dynamic surface grid within the region, the nested dynamic grid having a grid spacing that is smaller than a grid spacing of the dynamic surface grid.

The method can further include: after the assigning and before the selecting: determining a well trajectory solution from each of a plurality of cells within the nested dynamic surface grid, which define potential locations for the drill center, to the well target or reservoir segment; and calculating the value for the drilling or geologic attribute of each of the well trajectory solutions, wherein the assigning includes assigning corresponding values of the drilling or geologic attribute to each of the plurality of cells within the nested dynamic surface grid that define potential locations for the drill center.

The identifying can include comparing values of the drilling or geologic attribute assigned to the cells of the dynamic surface grid to a predetermined threshold.

The method can further include, after the assigning and before the selecting, creating a composite grid with finer grid spacing than the dynamic surface grid.

The drill center can be an onshore pad, well site, offshore platform, drillship or rig, or subsea template.

The drilling or geologic attribute can be at least one of measured depth, accumulated dogleg severity, drilling difficulty index, cost, or reservoir preformation.

The value of the drilling or geologic attribute can be a monetized value.

The selecting can include identifying at least two drill centers.

The method can further include managing hydrocarbons from a well disposed at the drill center.

The method can further include: adjusting at least one well target or reservoir segment; refining only those cells of the dynamic surface grid affected by the adjusting; and updating the composite attribute map based on the adjusting and refining.

The identifying can include identifying a plurality of well targets or reservoir segments. The assigning can include assigning, to each of the plurality of cells of the dynamic surface grid, a value of a drilling or geologic attribute that defines a quality of a drill center position relative to each of the plurality of well targets or reservoir segments. The method can further include: generating an attribute map for each of the well targets or reservoir segments; and combining the attribute maps.

A non-transitory computer readable storage medium encoded with instructions, which when executed by a computer causes the computer to execute a method, including: identifying a well target or reservoir segment; defining a dynamic surface grid, the dynamic surface grid being a representation of a ground surface, sea-level, or subsea surface above the reservoir upon which a drill center is locatable, and the dynamic surface grid including a plurality of cells that define potential locations for the drill center; assigning, to each of the plurality of cells of the dynamic surface grid, a value of a drilling or geologic attribute that defines a quality of a drill center position relative to the well target or reservoir segment; and selecting, based on a value of the drilling or geologic attribute, a location for the drill center corresponding to a location represented on the dynamic surface grid.

An apparatus, including: a memory device that stores executable instructions; and a processing circuit that executes the instructions in order to identify a well target or reservoir segment, define a dynamic surface grid, the dynamic surface grid being a representation of a ground surface, sea-level, or subsea surface above the reservoir upon which a drill center is locatable, and the dynamic surface grid including a plurality of cells that define potential locations for the drill center, assign, to each of the plurality of cells of the dynamic surface grid, a value of a drilling or geologic attribute that defines a quality of a drill center position relative to the well target or reservoir segment, and select, based on a value of the drilling or geologic attribute, a location for the drill center corresponding to a location represented on the dynamic surface grid.

BRIEF DESCRIPTION OF THE DRAWINGS

While the present disclosure is susceptible to various modifications and alternative forms, specific examples thereof have been shown in the drawings and are herein described in detail. It should be understood, however, that the description herein of specific examples is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of the present technological advancement. Moreover, certain dimensions may be exaggerated to help visually convey such principles.

FIG. 10 is a non-limiting example of a method of determining optimal drill center locations.

DETAILED DESCRIPTION

Non-limiting examples of the present technological advancement are described herein. The invention is not limited to the specific examples described below, but rather, it includes all alternatives, modifications, and equivalents falling within the true spirit and scope of the appended claims.

The present technological advancement can utilize a composite grid approach to optimize potential drill center locations and well paths. The composite grid approach can use searching and converging steps. The grid representations used in this approach can also be viewed as intermediate results that guide users in the proceeding iteration steps. Some benefits of the present technological advancement include reducing cycle time, maximizing producibility as well as providing more efficient and effective evaluation of multiple scenarios. The present technological advancement can also optimize both the drill center requirements (location and slot requirements) and the well path drilling parameters, for the purpose of planning and developing a hydrocarbon field.

The present technological advancement relates to a field development planning process that is facilitated by creating an interactive three-dimensional environment in which the user can conduct field development planning beyond traditional well planning and drill center optimization methods. The technological advancement can consider ground/subsea surface conditions to evaluate alternative scenarios based on the cost, payoff and drilling constraints of well trajectories, as well as configurations on the drill center, e.g. the number of drill centers and their locations. As used herein, the term "well trajectory" is a continuous pathway within a three-dimensional earth model that connects targeted segments and is characterized by its ability to connect the defined targeted segments while maintaining acceptable drilling complexity, cost, and stability.

Figure 1:
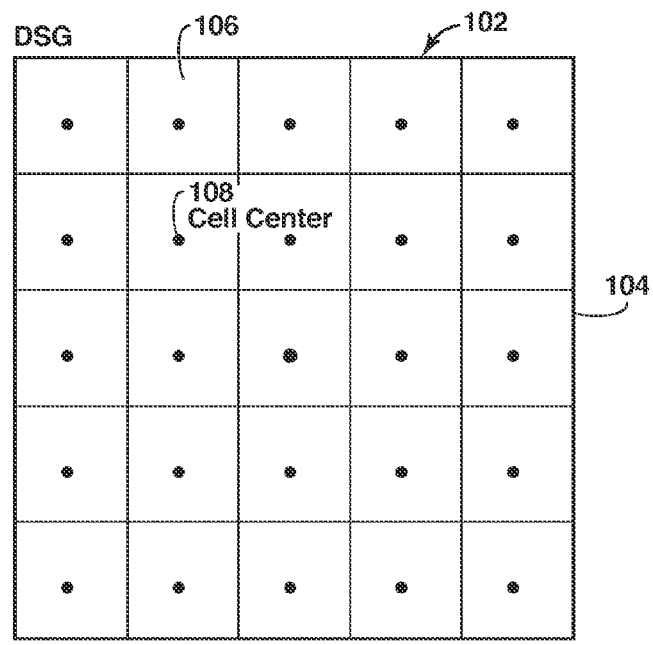
FIG. 1 is a non-limiting example of a Dynamic Surface Grid (DSG).

As shown in FIG. 1, the user can define an area 102 for potential locations to place a single drill center or multiple drill centers. The drill center is defined as an onshore pad, well site, offshore platform, drillship or rig, or subsea template or any other physical structure that would support a well head. The drill center could contain one or several well heads or top-holes.

FIG. 1 shows a non-limiting example of a composite grid data representation called a Dynamic Surface Grid (DSG) 104. The DSG 104 can be used for the purposes of optimizing the placement and design of drill centers and wells in a field development. DSG 104 is a representation of the surface upon which a drill center would be located. If the development is onshore, then the surface could be ground level. If the development is offshore, then the surface could represent sea level or the sea floor. Each cell of the DSG could potentially be an optimal drill center location for one or more well trajectories. The areal extent of the DSG can be defined by the user and could be regular or irregular. In addition, the user could define an absolute minimum distance between sampled locations (grid spacing) or a set number of locations to sample within the defined area. This configuration could be a surface topology map or some other map with the area or areas of acceptable drill center locations defined as a polygon.

As part of the optimization process, a value assigned to each cell 106 (or cell center 108) in the DSG 104 is calculated. This value represents a drilling or geologic attribute that the user could use to evaluate the quality of the well and drill center positions. A non-exhaustive list of possible drilling or geologic attributes are discussed below.

The DSG 104 is a representation, for each well location, of the search parameters and the optimization process value calculated as noted above. Each cell center 108 on the DSG 104 represents a potential drill center location for all of the wells considered in the optimization. Viable well path solutions can be searched for from each of the cell center points 108 to each of the well targets and/or reservoir segments. The drilling or geological attribute can be user defined and calculated for each well and potential drill center location. A target, whether a well target or reservoir segment, is a geological region/body within the three-dimensional shared earth model characterized by its potential to contain recoverable oil and gas (hydrocarbon) reserves.

The non-limiting example of FIG. 1 shows a DSG 104 with 25 cells. However, the number of cells within the DSG may be larger or smaller, and the cells may be regular or irregular shapes.

Figure 2:
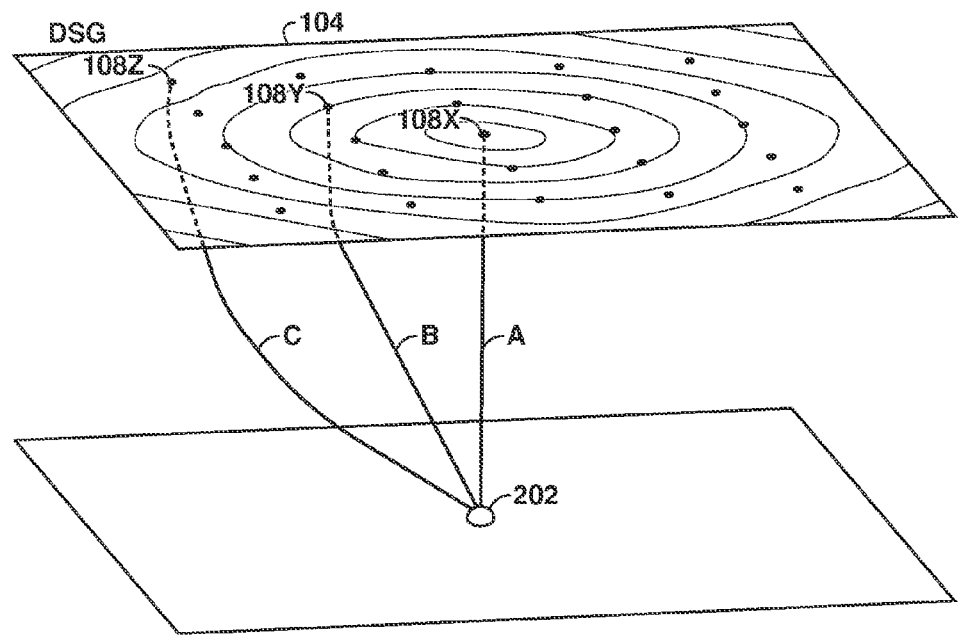
FIG. 2 is a non-limiting example of well paths from several potential drill center locations to a specific well target or reservoir segment.

FIG. 2 is a non-limiting example of how DSG 104 can be used to determine well paths A, B, and C from several potential drill center locations 108X, 108Y, and 108Z to a specific well target or reservoir segment 202.

Well target locations or reservoir segment locations can be defined by various manual methods or from an optimization process as described in US patent publication 2011/0153300 A1, System and Method for Planning a Drilling Optimization, by Holl et. al., the subject matter of which is hereby incorporated by reference in its entirety. Potential well paths can be calculated based on user well trajectory criteria at each potential drill center location defined in the previous step. In other words, the process involves defining a viable well path from the drill center (grid center point on the DSG) to reach each well target location or each reservoir segment. A value of an attribute will be calculated for each potential well path and assigned to the corresponding DSG grid center point from which the well path originated.

The present technological advancement can search for well path solutions for each the potential drill center locations 108X, 108Y, and 108Z. An attribute, such as measured depth (MD), can be calculated and stored on each cell center point or potential drill center locations. MD is a distance along the borehole measured from the top hole position (MD=0) to a given point. Total measured depth is a total distance for the borehole. MD is useable to evaluate the quality of the wells A, B, and C. As discussed in more detail below, the MD data for each potential drill center location can be gridded (i.e., assigned to cells 106) to create an attribute map that reflects the quality of each of the potential drill center locations relative to the well target and the resultant well path. An attribute map is a mapping of attribute values onto the DSG in a manner that visually depicts how values of the attribute change over the area represented by the DSG.

While FIG. 2 only displays three well paths, up to a total of 25 potential well paths (one for each cell in the DSG) can be generated for the single target well 202. Correspondingly, each of the 25 cells could receive a corresponding MD value (or other attribute value).

Figure 3:
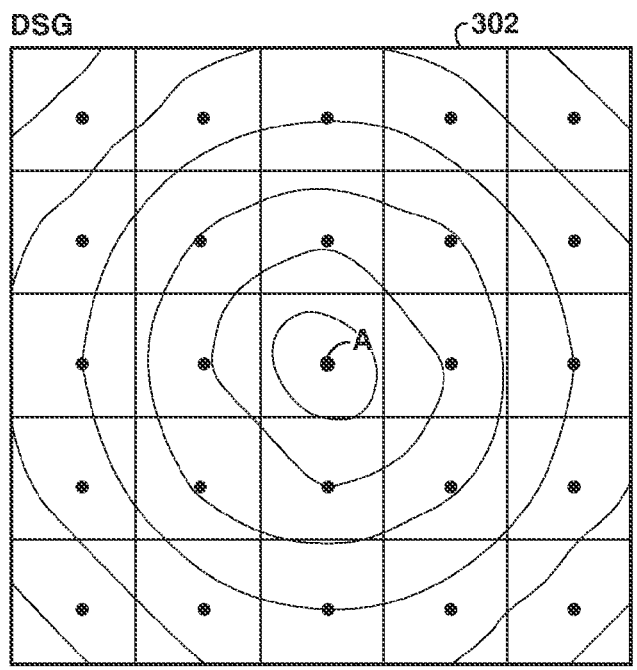
FIG. 3 is a non-limiting example of an individual attribute map on the DSG calculated for all potential drill center locations to one well target.

FIG. 3 shows a non-limiting example of an attribute map 302. In attribute map 302, all potential well paths from all potential drill center locations to the specified well target location were calculated. However, an attribute map need not include all potential wells nor all potential drill center locations.

The attribute map of FIG. 3 can be calculated from the example of FIG. 2, where MD is the attribute. Although any appropriate attribute could be used, the attribute map of FIG. 3 shows total MD from all potential drill center locations to the target well 202. Point A in FIG. 3 (corresponding to point 108X in FIG. 2) is the drill center position that would generate the smallest total MD (i.e., well A in FIG. 2 has the smallest total MD). Shading, color or grayscale, can be used on the attribute map to depict how total MD changes over the area under consideration. Point A, having the smallest total MD of the 25 potential drill center locations, is the optimal position for this example using total MD as the attribute.

If a well path cannot be generated within the defined drilling constraints then an extremely large or small value will be assigned as the attribute value for that drill center location. The value may be large or small depending on how the values are normalized (i.e., on a scale of 1 to 100; 1 being defined as either the best or the worst).

While total MD was used in the example of FIG. 3, other attributes such as drilling difficulty, total reach, or geologic data assigned to each target or reservoir segment could be the attribute assigned to the potential drill center locations. An attribute map can be created for each of these attributes (or others) in addition to the attribute map of FIG. 3 based on total MD. Thus, a series of attribute maps, each based on a different attribute, could be generated for each well target 202.

Different areas on the attribute map can be assigned different weights. A weighting system can be used to weigh individual potential drill center locations or areas of potential drill center locations more favorably or areas of potential drill center locations could be penalized (negatively weighted). Certain areas of surface topology can be taken into account and used to weigh individual potential drill center locations or areas of potential drill center locations more or less favorably. In an offshore application, water depth, sea floor slope or sea floor stability are non-limiting examples of what could be a consideration for drill center placement.

Figure 4:
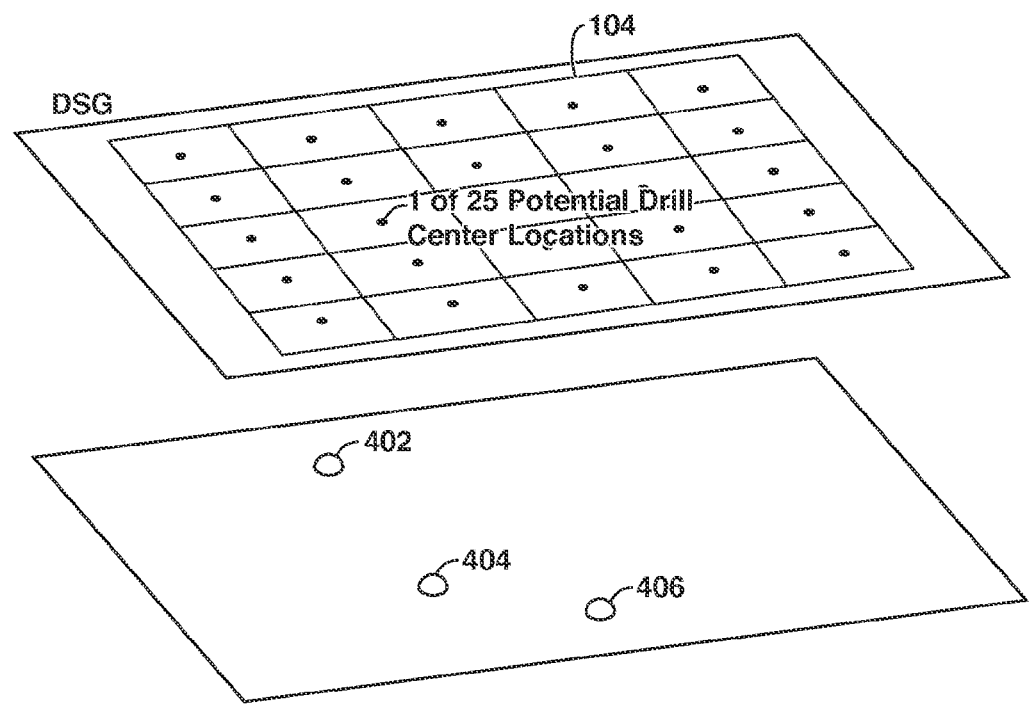
FIG. 4 is a non-limiting example of an initial configuration for potential drill center locations on a DSG.

The present technological advancement can operate on multiple attributes and multiple well target locations. FIG. 4 shows a non-limiting example with DSG 104, with 25 potential drill center locations, and three well targets 402, 404, and 406. The number of potential drill center locations that the present technological advancement will test is defined by the dimensions and areal extent of the DSG. In addition to this, the number of possible well paths the process will consider is a function of the DSG and the number of well targets or reservoir segments. As the present technological advancement iterates through successive well paths, an attribute or attributes are calculated to reflect the quality of those well paths (i.e., total MD as discussed above). Based on the attribute or attributes calculated, a corresponding attribute map or maps can be generated.

Figure 5:
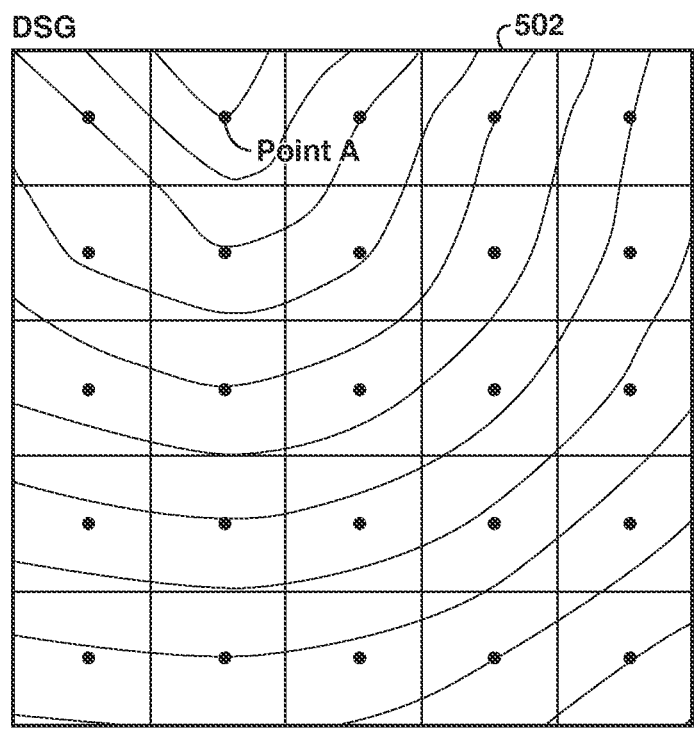
FIG. 5 is a non-limiting example of a composite attribute map on a DSG calculated for a target well in FIG. 4.

FIG. 5 shows attribute map 502 corresponding to well target 402 in FIG. 4. The attribute used for attribute map 502 is total MD. The attribute map is created based on a possible well path from each of the 25 potential drill center locations in DSG 104 in FIG. 4 to well target 402. The smallest total MD, and the optimal drilling location based on total MD, is point A.

Figure 6:
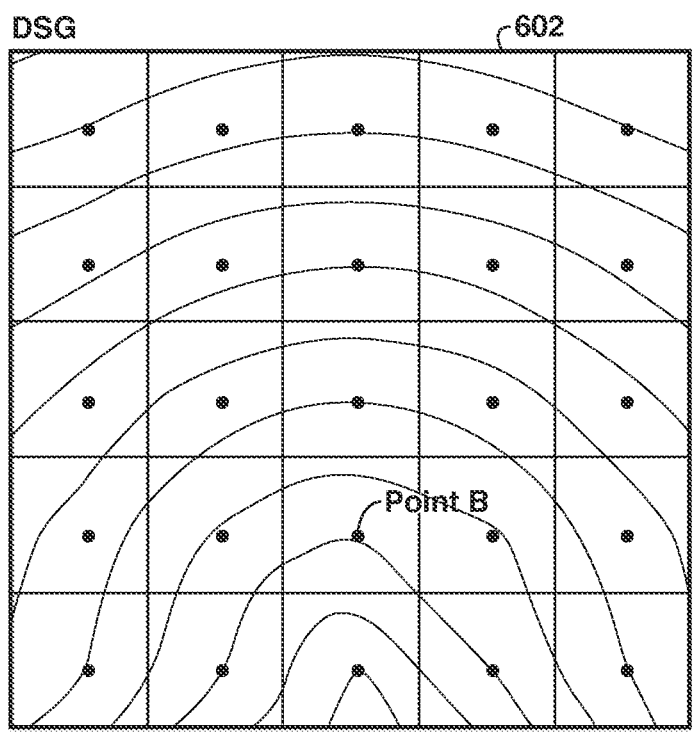
FIG. 6 is a non-limiting example of a composite attribute map on a DSG calculated for a target well in FIG. 4.

FIG. 6 shows attribute map 602 corresponding to well target 404 in FIG. 4. The attribute used for attribute map 602 is total MD. The attribute map is created based on a possible well path from each of the 25 potential drill center locations in DSG 104 in FIG. 4 to well target 404. The smallest total MD, and the optimal drilling location based on total MD, is point B.

Figure 7:
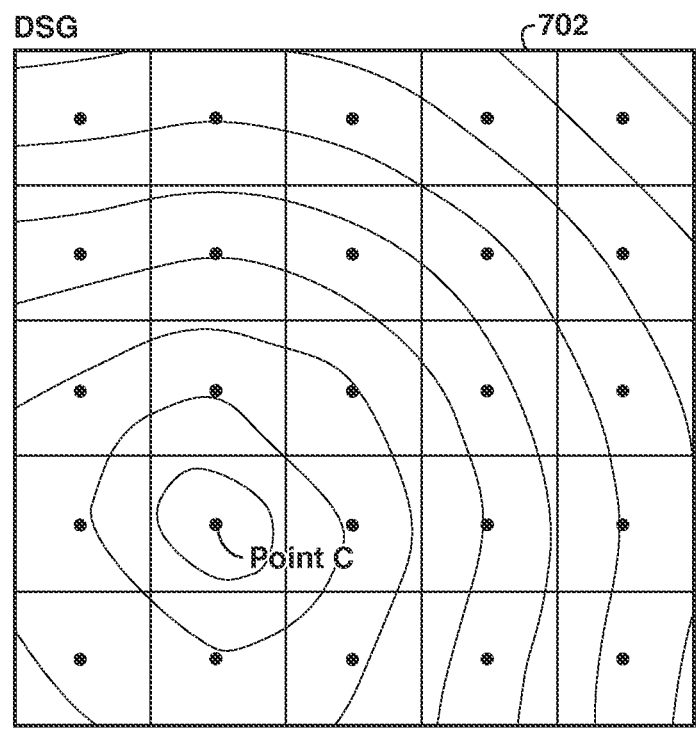
FIG. 7 is a non-limiting example of a composite attribute map on a DSG calculated for a target well in FIG. 4.

FIG. 7 shows attribute map 702 corresponding to well target 406 in FIG. 4. The attribute used for attribute map 702 is total MD. The attribute map is created based on a possible well path from each of the 25 potential drill center locations in DSG 104 in FIG. 4 to well target 406. The smallest total MD, and the optimal drilling location based on total MD, is point C.

The attribute maps in FIGS. 5, 6, and 7 can be combined into a composite single attribute map. As discussed, above, attribute maps may be created for a plurality of different attributes. A single composite attribute map can be created for each of these respective attributes and for all well targets or reservoir segments under consideration.

These individual well attribute maps can be combined into a composite single attribute map. This step would create a single composite map for each attribute and for all well targets or reservoir segments in the optimization. This suite of attribute maps could be used individually to evaluate the optimal drill center location. At each step of the process, each drill center location, well target location or attribute could be weighted more favorably or penalized.

Figure 8:
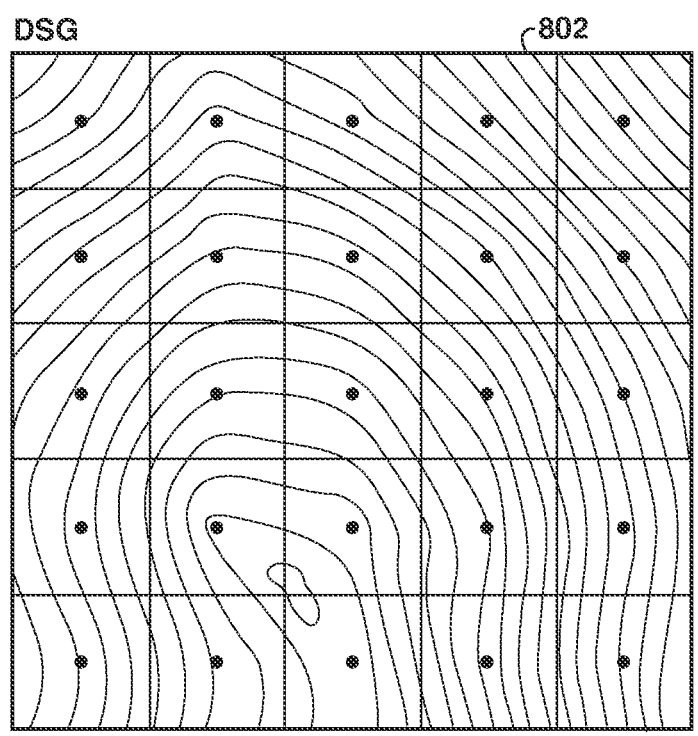
FIG. 8 is a non-limiting example of a total composite attribute map on a DSG for a target well.

FIG. 8 is a non-limiting example of a composite single attribute map, which is generated from the attribute maps of FIGS. 5, 6, and 7. Here, the single attribute is total MD. FIG. 8 includes all three well target locations 402, 404, and 406 utilized in FIGS. 4, 5, 6, and 7. The individual attribute maps of FIGS. 5, 6, and 7 can be combined in numerous ways, including averaging them with equal or different weights assigned to each attribute map. Composite single attribute map 802 has weighted well target location 406 (attribute maps 702) more heavily than other well target locations 402 and 404 (attribute maps 502 and 602) in order to show variability. For example, in an offshore application, well target location 406 may have a more advantageous sea floor slope than well target locations 402 and 404, thus justifying the heavier weighting. As discussed further below, map 802 can be further refined by going to a smaller DSG spacing (i.e., increase the number of cells) in select areas either manually or through the optimization process of the present technological advancement.

FIG. 8 is a composite single attribute map based on total MD. However, a similar composite single attribute map can be generated for the attribute of drilling difficulty. The composite single attribute map based on MD can be combined with the composite single attribute map based on drilling difficulty to create a total composite attribute map. The composite single attribute maps for MD and drilling difficulty can be averaged together using weightings determined by a user. The weightings used in weighted averaging in combining any of the types of attribute maps discussed herein can all be equal, different, positive, negative, or a combination thereof.

Figure 9:
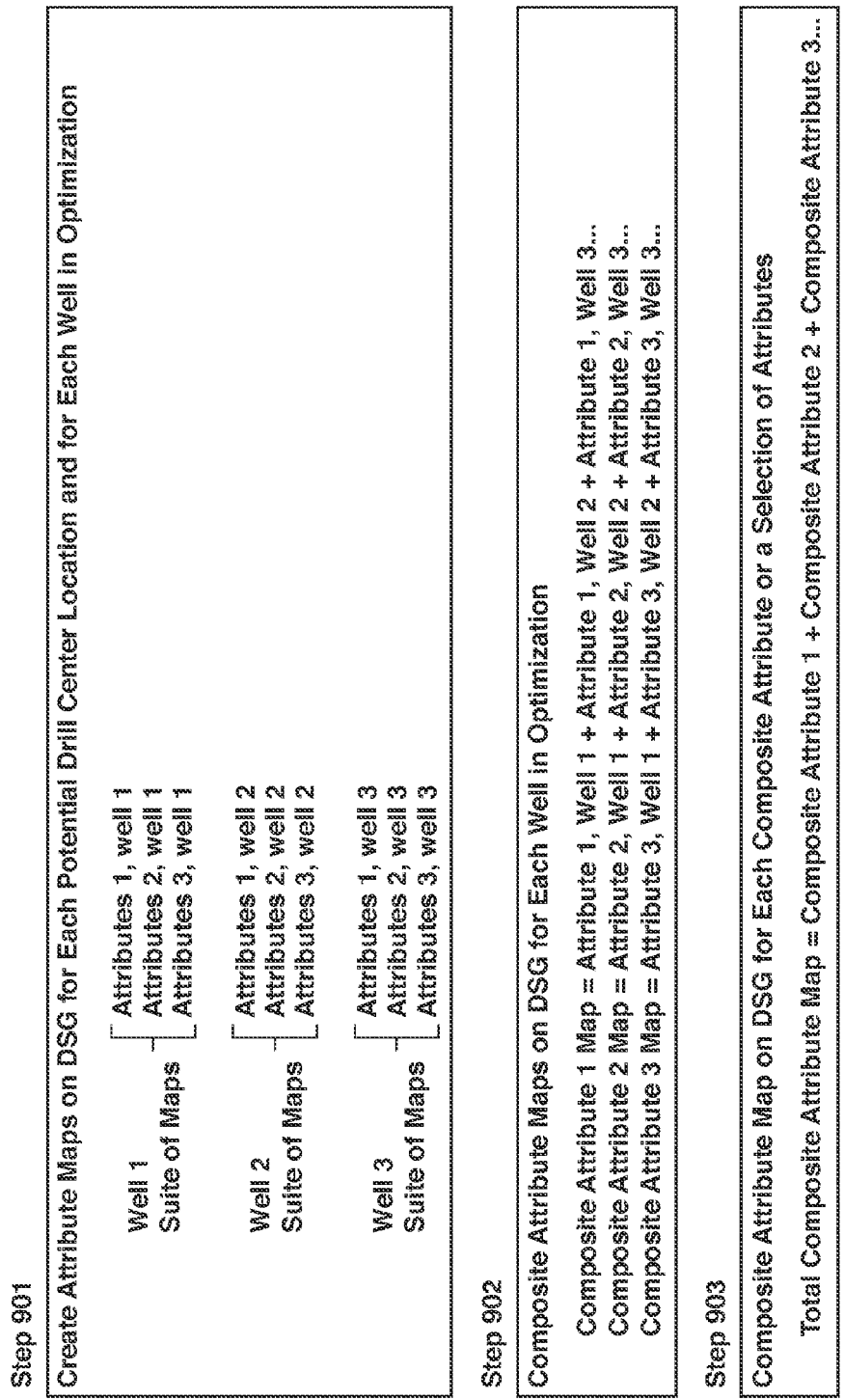
FIG. 9 is a non-limiting example of a method of generating attribute maps.

FIG. 9 shows a generalized process for generating attribute maps as discussed in FIGS. 5-8. Particularly, FIG. 9 shows the addition of the attribute maps. However, other mathematical operations may be employed that are consistent with the present technological advancement. Other mathematical operations could include, for example, $\alpha^1(\delta) \otimes \alpha^2(\delta) \otimes 2\alpha^3(\delta)$, where $\alpha^1$, $\alpha^2$, $\alpha^3$ are specific attributes and $\alpha(\delta)$ represents the value $\alpha$ at $\delta$. In the preceding equation, $\otimes$ may represent any algebraic expression. Other more sophisticated optimization methods may use vector or multi-objective optimization. For example $$opt \begin{pmatrix} \alpha 1(\delta) \\ \alpha 2(\delta) \\ \vdots \\ \alpha n(\delta) \end{pmatrix}$$

where "opt" is an operator or process to choose multiple attributes for a given location. In the preceding example, $\alpha$ could represent any number of attributes to consider in a drill center optimization. Such attributes could include but are not limited to, Accumulated Curvature, Dog Leg Severity, Horizontal Reach, Total Payoff based on potential recoverable hydrocarbons, etc. Derivative attributes could also be determined to obtain actual monetary cost or reward and used in the optimization process. Additional applications could also include determining the optimal number of drill sites based on a set of attributes with the result being a clustering of drill centers and associated wells for each drill center scenario (one drill center vs. two drill centers vs. three drill centers etc.).

Step 901 describes creating the individual attribute maps for each potential drill center location and for each well target. Step 902 describes creating the composite single attribute maps. Step 903 describes creating the total composite attribute map or maps. Steps 901 through 903 can be executed in a single batch process or the user could be very interactive and interrogate the results as the process proceeds. An advantage of the present technological advancement is that as iterations to the well target locations or reservoir segments are made, only those maps that are affected need to be recalculated. Conventional optimization methods would require a re-run of the entire configuration.

FIG. 10 builds on the process described in FIG. 9 and describes a more practical application for applying the present technological advancement to an oil and/or gas field development optimization. In Step 1001 of FIG. 10, the DSG (see FIG. 1) is defined for an area of interest. The data structure of the DSG can be a single grid, a nested grid and/or a composite grid in which the size of the grid would cover the potential field. A single grid is a grid whose structure is such that all grid cells have the same dimensions over its entire extent. A nested grid is actually multiple grids with different grid dimensions over portions of its extent. The nested grid allows the refinement of each cell in a single grid to be recursively obtained. A nested grid approach could be utilized where the initial grid cell size is too coarse to determine a precise drill center location. Its utilization allows the optimization process to recursively calculate a well site location more precisely. A composite grid is a combination of various grid structures which potentially could result in variable grid sizes across its extent. Utilizing a composite grid approach may allow more flexibility in grid size and shape in complex and highly variable areas of the grid. Although the examples discussed herein show the DSG as a regular structured grid, the DSG could be represented as triangulated grid, unstructured grid or a combination of both if that data structure better represents the potential locations of well sites or enhances the refinement of the optimization algorithms. The present technological advancement can also employ an iterative refined grid approach using the Dynamic Surface Grid method. For example, if a user wanted to use a 5 by 5 grid for the optimization and 3 iterations with an original grid size of 2500 feet by 2500 feet, then the first iteration would have a grid spacing equal to 2500/5=500 feet. The second iteration could refine the original grid to 500/5=100 feet and the last iteration could have the final grid spacing of 100/5=20 feet.

Figure 11:
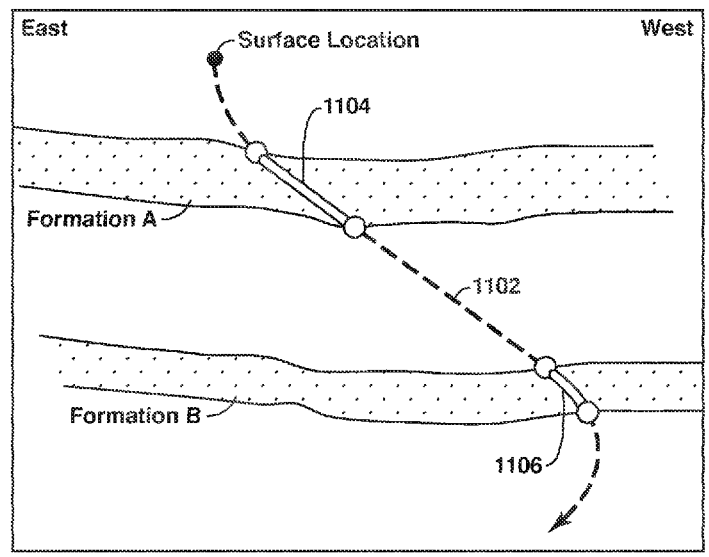
FIG. 11 is a non-limiting example of reservoir segments.

Step 1002 includes selecting well targets or reservoir segments. Although well targets are acceptable, reservoir segments may be more practical when considering the drilling implications. Reservoir segments can be used by the method instead of well targets in order to provide more user control on how a well path will intersect the reservoir. Well targets are the traditional way to design a well path and represent specific or fixed XYZ locations in the subsurface that a well path must intersect and pass through. Reservoir segments on the other hand are a "targeted segment" of a precursor well that represents part of the desired path of the well through the reservoir. Reservoir segments differ from well paths because they do not connect in any way to a surface location initially. The reservoir segment provides a mechanism to initialize a tangent portion of a well path before a complete well is designed. As the workflow proceeds, the reservoir segment would become part of the well trajectory during the well path planning process. As shown in FIG. 11, a well trajectory 1102 is created to link two reservoir segments (1104 and 1106) in two stacked reservoirs (Formation A and Formation B). A well trajectory is a continuous pathway within the 3D earth model that will attempt to honor the pre-defined targets or reservoir segments. The trajectory needed to reach and honor a specific reservoir segment orientation would require satisfying certain engineering constraints such as accumulated dog leg constraints, angle of penetration to the targets/reservoir segments as well as distances for anti-collision to faults/salt region etc. When this is not possible, then tradeoffs will be needed, such as changing the target or segment orientation, modifying the drilling constraints or changing the drill center location. In addition to specific well trajectory requirements, there may be other considerations such as the cost and payoff associated with the field planning, determining the number of well sites required for the field as well as determining their locations given the issues of ground surface conditions, such as man-made buildings/roads and natural objects to avoid such as rivers. Other optimization parameters include the cost/payoff, of the generated wells and their distribution within the development area. As an example, it could be desirable to have the well site location to be horizontally as close aerially to the targets or reservoir segment. But due to the constraints of dogleg severity of a well path, location proximity may not always be the optimal choice. The present technological advancement resolves these conflicting conditions and proposes a field planning process for well sites and well trajectories that can, for example, minimize the cost, maximize the payoff and also take into account the environmental impacts. This can be achieved by making attribute maps that reflect well trajectory cost from potential drill center locations, a second attribute map for payoff and a third attribute map that would either penalize or reward potential drill center locations based on environmental impact. These maps would then be combined to optimize on these three criteria. Taking the environmental impact attribute as an example, the initial DSG grid could be assigned a ground surface values to denote the initial cost based on ground surface conditions. Factors that could affect environmental cost could include areas close to man-made objects such as towns, railroads etc. or closeness to natural resources such as rivers, forests etc. Potential drill center location that are too close to these factors could be assigned much higher costs so that the optimization algorithm could avoid those areas altogether.

Step 1003 of FIG. 10 includes defining the attributes that will be used to optimize the drill center. Depending upon the specifics of the field development plan, multiple attributes can be utilized in the optimization. For example, the attribute of measured depth would represent a calculated measured depth for a planned well trajectory from a surface location on the DSG to a given set of targets or reservoir segments. Attributes such as DDI (Drilling Difficulty Index) would represent a measurement of drilling difficulty for planning such a well trajectory. DDI is defined as DDI=log [TD(AHD/VD)Tort] where TD is the total measured depth, AHD is along hole displacement, VD is the total vertical depth, and Tort is the tortuosity. Attribute COST would represent the cost of planning the well in terms of a dollar amount or other monetized value. A monetized value is one that is expressed in terms of a currency or security. Attribute PAYOFF would represent the amount of resource (oil, gas, water, or some combination thereof) extracted from reservoir relative to the net investment cost. In other words, the monetary assignment for total drilling COST, PAYOFF etc.

(expressed in dollars, barrels, monetized value, etc.) can be assigned based on the calculated values of the attributes. These attributes, along with other planning parameters, could be used to derive an optimal development plan for the field. Typical planning parameters may also include minimum distance between well sites, cost of construction/operating well sites, engineering constraints for the well trajectories, etc. The result from this step is a set of cost/benefit functions captured as composited grid attributes which can be used to evaluate and optimize each potential drill center location and their associated well paths. Attributes can be calculated for each potential well path, each potential well target or reservoir segment, and for each potential drill center location. The generated/obtained attribute values are assigned to a DSG cell center, which represents a potential drill center. Calculation of these attributes can be accomplished through conventional means known to those of ordinary skill in the art.

Step 1004 of FIG. 10 includes high grading (i.e., filtering to obtain the highest quality) drill center locations based on initial results of the optimization.

Figure 12:
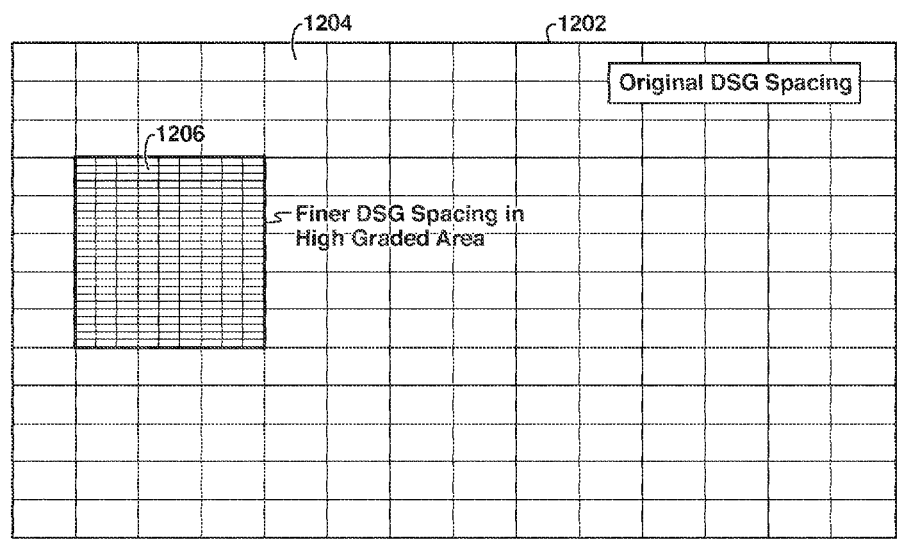
FIG. 12 is a non-limiting example of a DSG with different spacing.

Step 1005 of FIG. 10 includes refining the initial results. The uniqueness of the Dynamic Surface Grid is that as the total composite grids are generated and analyzed, further refinements to the Dynamic Surface Grid can be made based on those results. In other words, the dynamic grid can be re-gridded at a finer spacing in those areas dictated by the results generated from the coarser grid. As an example, FIG. 12 shows a nested regular grid 1202 of the ground surface. It includes coarse cells 1204 for the entire grid and refined cells 1206 in a surface area on the left-hand side of the grid. As the analysis proceeds, some areas of the DSG can be further refined via smaller grid spacing (1206) to more accurately define an optimal drill center location. Advantageously, a further more detailed analysis can be concentrated to select area, which provides increased speed and computational efficiency.

The region in the DSG for the refined cells 1206 can be determined by selecting the cells that have the best potential for a drill center. The best site for locating a drill center can be determined by comparing values of the attribute assigned to cells in the DSG to a predetermined threshold, wherein cells with values above or below the threshold can be chosen to be further refined through the use of the nested or refined cells 1206. This comparison may be a manual process or may be automated.

The area in the refined cells can also be pre-determined by the user based on the ground conditions or they can be determined dynamically by the optimization process using a refined grid technique as discussed previously. In addition to altering the grid spacing, individual well targets or reservoir segments can be adjusted to satisfy drilling constraints and/or the number of drill centers can be varied to test various scenarios.

Step 1006 of FIG. 10 includes re-running the optimization process and looping through Steps 1005 and 1006 as necessary in order to obtain a satisfactory drill center optimized solution. The iterations can continue until the user or the optimization process converge on an acceptable solution. A person of ordinary skill in the art will be able to recognize an acceptable solution to their particular situation. An optimal solution for one situation is not necessarily a solution to other situations.

Figure 13:
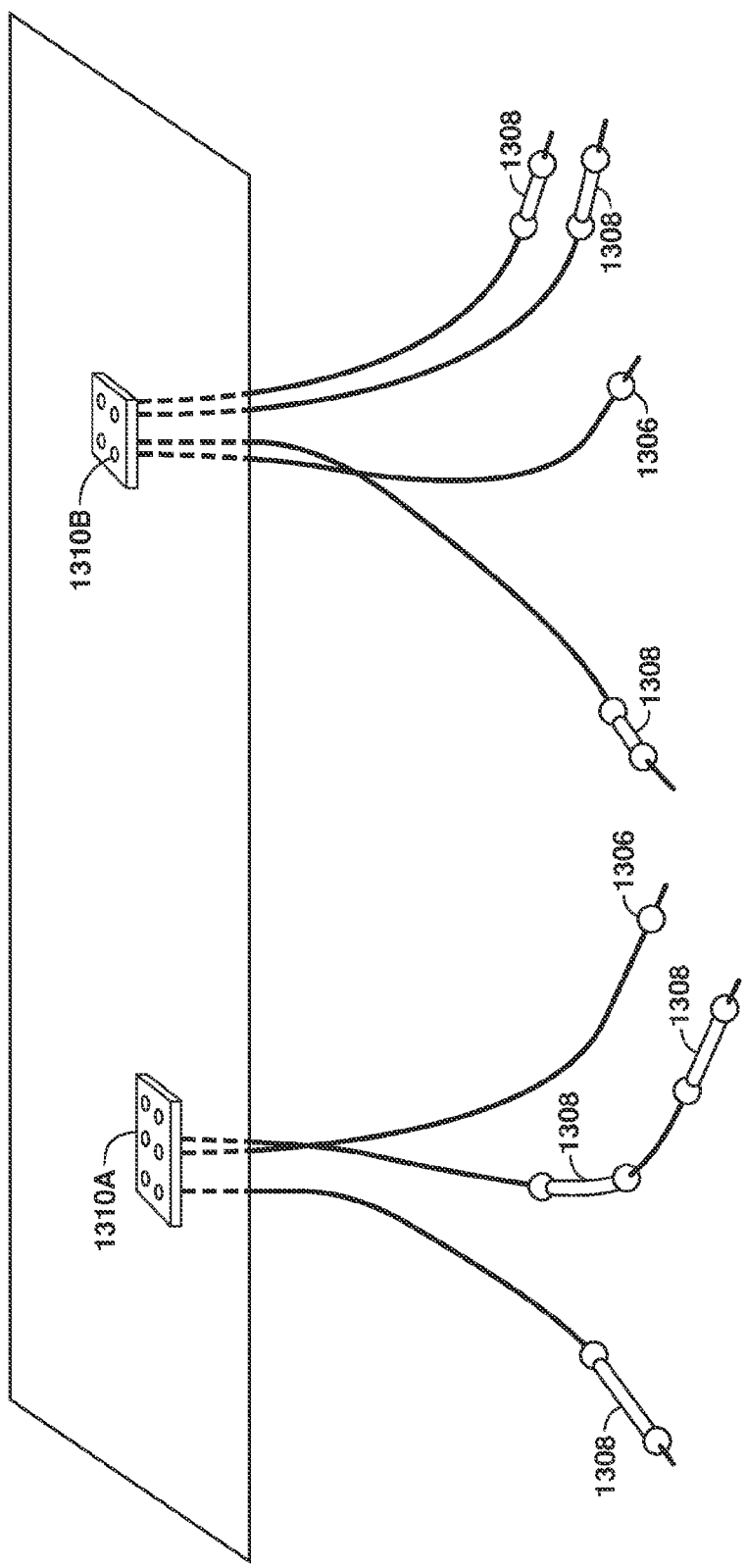
FIG. 13 is a non-limiting example of the results after an initial optimization where two optimal drill center locations were identified.

FIG. 13 shows a more practical utilization of the present technological advancement as it would apply to a field development planning process. In FIG. 13, an oil field 1302 with a single reservoir 1304 is shown. A reservoir is a subsurface rock formation from which a production fluid (including liquids and/or gasses) can be harvested. The rock formation may include granite, silica, carbonates, clays, and organic matter, such as oil, gas, or coal, among others. Reservoirs can vary in thickness from less than one foot (0.3048 m) to hundreds of feet (hundreds of m). The intrinsic properties, such as permeability of the reservoir, provide the potential for production. A reservoir may often be located at a depth of hundreds of meters or more below the surface of the earth or the seafloor.

In this example, targets 1306 and reservoir segments 1308 are selected in specific areas in the reservoir 1304. In the exemplary solution illustrated in FIG. 13, two optimal drill center locations (1310A and 1310B) are identified for the given subsurface well targets 1306 and reservoir segments 1308. The resultant well paths are generated and displayed, and are assigned to specific drill centers and slot locations. Other subsurface data can be integrated with FIG. 13 for further path refinement. The present technological advancement can be flexible enough to utilize both wells and reservoir segments or a combination of both.

Figure 14:
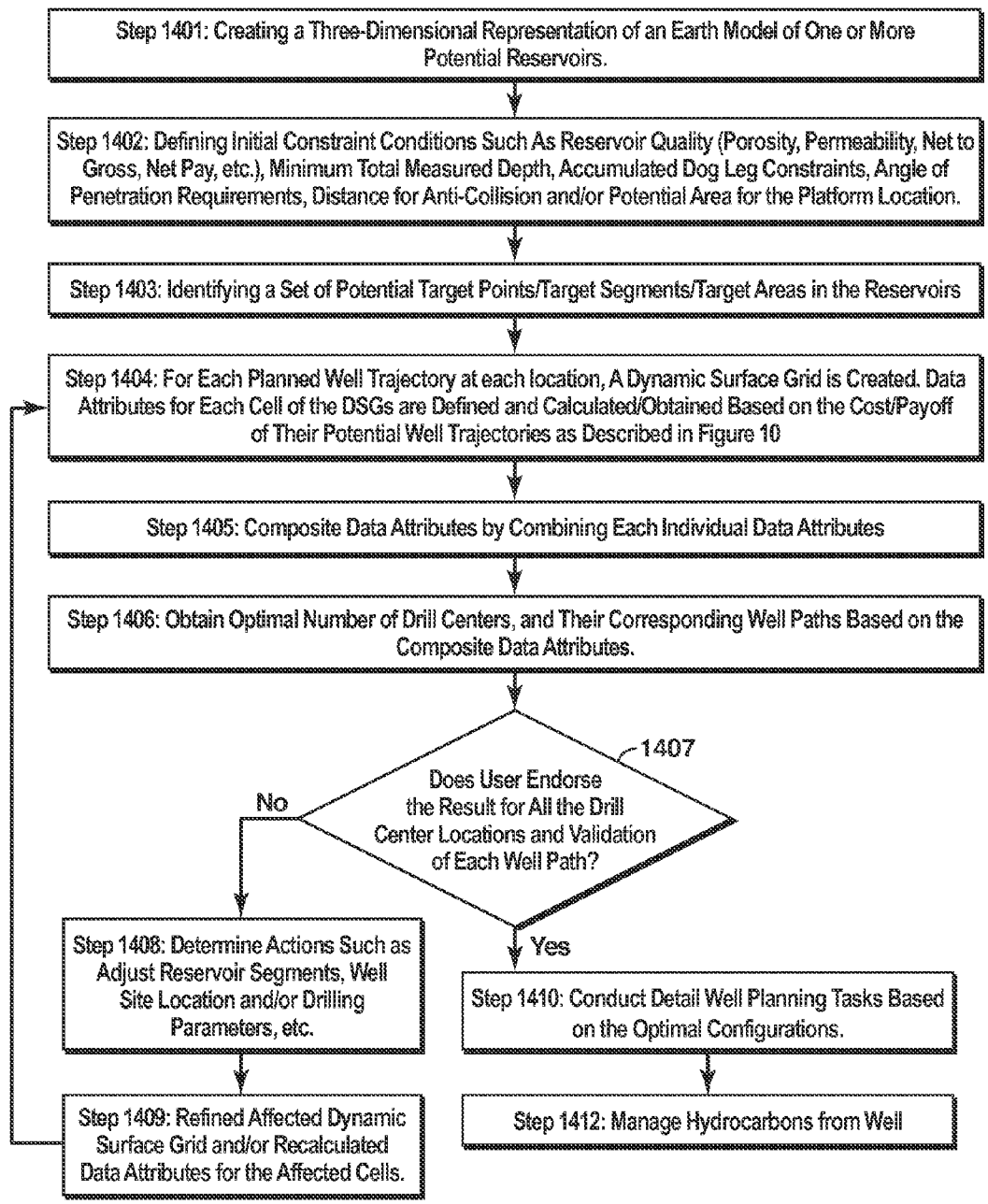
FIG. 14 is a non-limiting example of a method for developing a field development plan.

FIG. 14 is a non-limiting example of a method for developing a field development plan. Step 1401 includes a user creating a three-dimensional representation of an Earth model of one or more potential reservoirs including, but not exclusive to, geological and engineering objects such as fault surfaces, and/or salt bodies. An Earth model is a geometric model of a portion of the Earth that contains material properties. Uncertainty associated with the data could be taken into consideration adding favorable weight or penalizing areas of the reservoir during the optimization process. Both surface constraints and subsurface constraints can be defined and utilized for well trajectory avoidance. Reservoirs can be represented as models, either as regular grid as would be the case for a seismic volume, a stratigraphic grid such as is the case for a geologic model, and/or as an unstructured grid such as the case for a reservoir model. A seismic volume is seismic data (information collected from seismic survey that includes or represents seismic events or signals that reflect and/or diffract at discontinuous objects and/or continuous horizons) defined in a 3D representation of the reservoir. Seismic data may be represented as a multi-dimensional matrix of values, wherein three coordinates are used to represent the 3-D location of a particular data volume in time and space (e.g., x, y, and t) and numerous additional terms may be used to represent specific physical attributes associated with the volume, such as impedance, velocity, density, seismic attributes, and the like. A geologic model is a computer-based representation of a subsurface earth volume, such as a petroleum reservoir or a depositional basin. Geologic models may take on many different forms. Depending on the context, descriptive or static geologic models built for petroleum applications can be in the form of a 3-D array of cells, to which reservoir properties are assigned. Many geologic models are constrained by stratigraphic or structural surfaces (for example, flooding surfaces, sequence interfaces, fluid contacts, faults) and boundaries (for example, facies changes). These surfaces and boundaries define regions within the model that possibly have different reservoir properties.

Properties within the Earth model data may include, but are not restricted to, pore pressure, fracture gradient, temperature, lithology, stress orientation and magnitude, etc. These properties could be extracted and associated with the well targets or reservoir segments to use in the DSG attribute calculation and the optimization.

Before or during field development planning, a set of constraint conditions are defined as described in Step 1402. The constraint conditions may include, but not restricted to, reservoir quality (porosity, permeability, net to gross, net pay, etc.), minimum total measured depth, accumulated dog leg constraints, angle of penetration requirements, distances for anti-collision and/or potential area for the platform location. These constraint conditions are used to determine the acceptability of drill center locations and trajectories of the planned well paths. Some constraints may be critical to determine the proper drill center location based on surface or subsea conditions. The constraint conditions can be defined by the user or they can also be modified by the field development planning algorithms during the optimization process.

Based on the Earth model, Step 1403 includes identifying a set of potential well target points or reservoir segments in which their corresponding well paths are planned in response to the geologic and engineering constraints stipulated in the earlier steps. The selection of well target point locations and the trajectories of reservoir segments within the earth model could be based on geoscience and/or reservoir engineering criteria. For example, they could be manually selected from reservoir sweet spots (areas of the reservoir where the majority of attributes are most favorable) or their locations selected through reservoir simulation or other optimization methods. Moreover, reservoir segments may be defined based on the top or base surface of the reservoir through desirable targeted regions of the reservoir. The user could then interactively manipulate the paths, directions of the reservoir segments to fine-tune the producibility of the given selections. Alternatively, reservoir segments can be defined based on the three-dimensional geo-bodies using volumetric properties and connectivity criteria, such as connectivity analysis using seismic/geological/reservoir models. US 2011/0153300, referenced earlier, discusses the use of reservoir segments in field development planning.

Figures 15, 16:
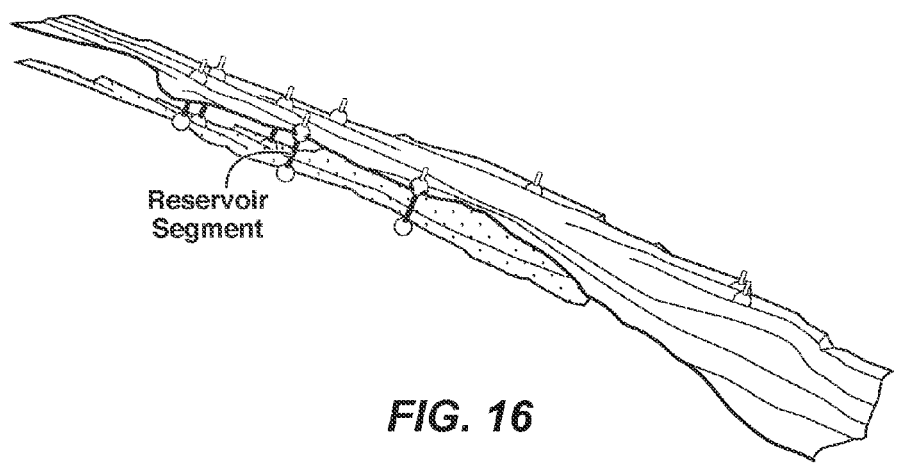
FIG. 15 is a non-limiting example of a graphical user interface for entry of initial conditions and constraint parameters for an optimization.
FIG. 16 is a non-limiting example of the suite of reservoir segments the optimization will use to generate viable well paths and optimal drill center locations.

Step 1404 of FIG. 14 includes for each planned well trajectory, at each cell location, a DSG is created. Data attributes for each cell of the DSGs are defined and calculated/obtained based on the cost/payoff of their potential well trajectories as discussed above in regards to FIG. 10. FIG. 15 shows a non-limiting example of a user interface panel that allows the user to set-up the initial process. A surface area for the boundary of the DSG can be specified that depicts the search area for potential well site locations as shown on the left-hand side of the FIG. 15. Well path design and constraints parameters are also set, such as a first hold distance from the starting location or a hold before distance before the reservoir segment, as well as the maximum dogleg severity constraints. Those schooled in the art of well path planning would be familiar with these and other well planning parameters. Minimum distance constraints between multiple drill centers and the DSG search parameters are also specified by the user as shown on the right-hand side of the panel in FIG. 15. The initial setup can include defining (1) the DSG extents (search area) and any additional extensions around that area, (2) viable well path parameters, (3) the DSG grid spacing, (4) the number of iterations for the convergent optimization to allow, and (5) a minimum distance between multiple drill centers if considering more than one.

FIG. 16 is a non-limiting example of the suite of reservoir segments the optimization will use to generate viable well paths and optimal drill center locations. The reservoir segments are defined on the top and base of a reservoir interval. In this example, nine reservoir segments are defined and each reservoir segment is shown as a polyline segment with two end point denoted as balls. In this field development planning example, the optimization process would create ten well trajectories for each of the ten reservoir segments. Each of these resultant well trajectories or paths would intersect and coincided with the inclination and azimuth direction of the reservoir segments.

The task of a field development plan would typical include determining the locations and number of well sites/platform/subsea templates, etc. A set of data grids, called Dynamic Surface Grids, are used to assist in evaluating and optimizing drill center sites and their associated well trajectories, and are discussed above.

Figure 17:
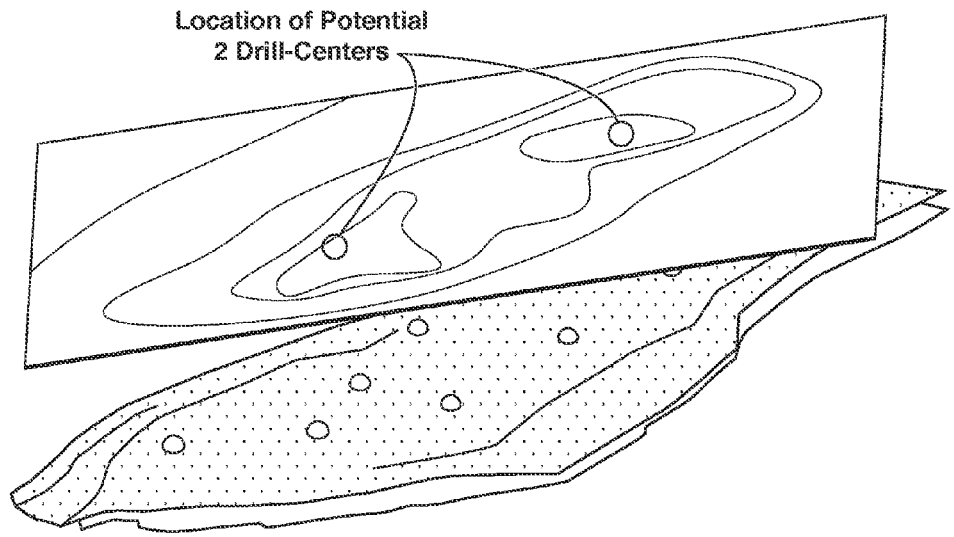
FIG. 17 is a non-limiting example of the DSG optimization for the suite of reservoir segments in FIG. 16.

In step 1405 of FIG. 14, composite data attributes (single composite attributes and/or total composite attributes) are generated. FIG. 17 is a non-limiting example of a DSG optimization for the suite of reservoir segments displayed in FIG. 16 and the initial set-up conditions depicted in FIG. 15. The optimization was set to allow two potential drill centers. The example of FIG. 17 shows a total composite attribute high grading two potential drill center locations that satisfy the constraints for the selected reservoir segments and optimization variables. The attribute may be obtained by a mathematic function, such as weighted average, based on the nine DSG individual attributes from each of the reservoir segments.

The distribution of the aggregated attribute would indicate potential optimal well site locations based on the optimal clustering or searching process (Step 1406). In this example, the process determined that a two drill center configuration would satisfy the optimization. However, the process could determine that more than two drill centers is an optimal configuration. Furthermore, based on other aggregated data attributes such as minimized total cost and the maximized payoff, the results for the final drill center or drill center locations could be further refined.

Figure 18:
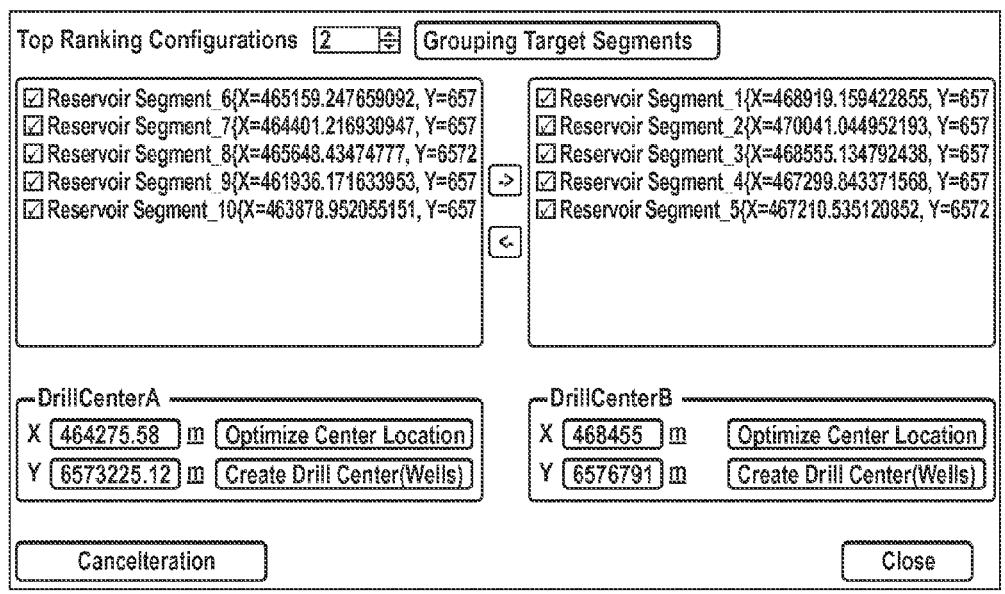
FIG. 18 is a non-limiting example of a graphical user interface for entry of various drill-center configurations and target segments.
Figure 19:
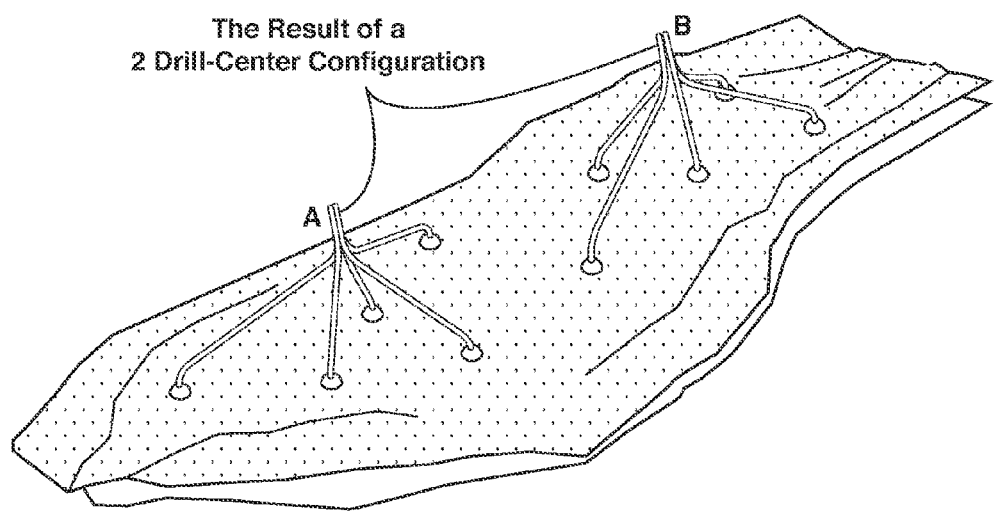
FIG. 19 is a non-limiting example of the well trajectories generated and the associated drill centers described in FIG. 18.

Referring to FIG. 18, the process of FIG. 14 will likely generate multiple well configurations which satisfy the criteria. These configurations can be organized by rank order. The example of FIG. 18 shows the two top ranking configurations for a two drill center solution. The first drill center consists of five well trajectories and the other also consists of five well trajectories; segments 6, 7, 8, 9, and 10 with drill center A and segments 1, 2, 3, 4 , and 5 with drill center B. The result of this specific two drill center development plan is shown in FIG. 19. In this case, all the wells are assigned the same top hole position until the user defines the specific drill center dimensions (slot numbers and slot spacing).

The result of the field development analysis can be displayed along with other geological engineering objects including geologic models, reservoir models and interpretation products. The user can then interactively evaluate the results by visually and/or numerically comparing the well paths in a 3-dimensional environment. The advantage of the present technological advancement is the ability to iterate and refine the results, i.e. if a user deems the current field planning results not acceptable and wants to evaluate other possible configurations, possible actions may include adjusting the reservoir segments, moving the well site locations, change the drilling parameters or constraints, increasing or decreasing the number of drill centers and/or re-assigning wells to specific drill centers. Steps 1407 and 1408 in FIG. 14 refer to this process in the detailed workflow.

In step 1408, at least one well target or reservoir segment is adjusted or modified. Non-limiting examples of the possible modifications to the well target or reservoir segment are discussed below in the context of FIGS. 20-23. In step 1409 can include refining only those cells of the dynamic surface grid affected by the adjusting. Such a refinement can be accomplished by regridding the DSG, and/or using a nested grid, and/or using a composite grid. The refinement may be automatic or manual. The composite attribute map generated from the first iteration of FIG. 14 can be updated based on the adjusting and refining steps of 1408 and 1409.

Figure 20:
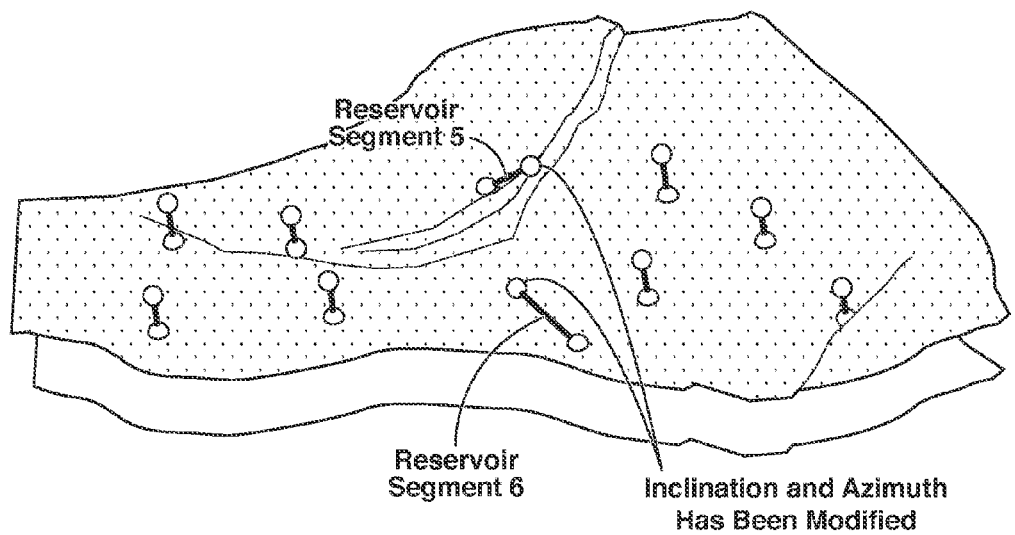
FIG. 20 is a non-limiting example of how parameters can be modified to refine results.

FIG. 20 shows an example of such a modification; two reservoir segments (5 and 6) are modified. The modifications involved changing the locations and orientations (inclinations and azimuths in this case).

Figure 21:
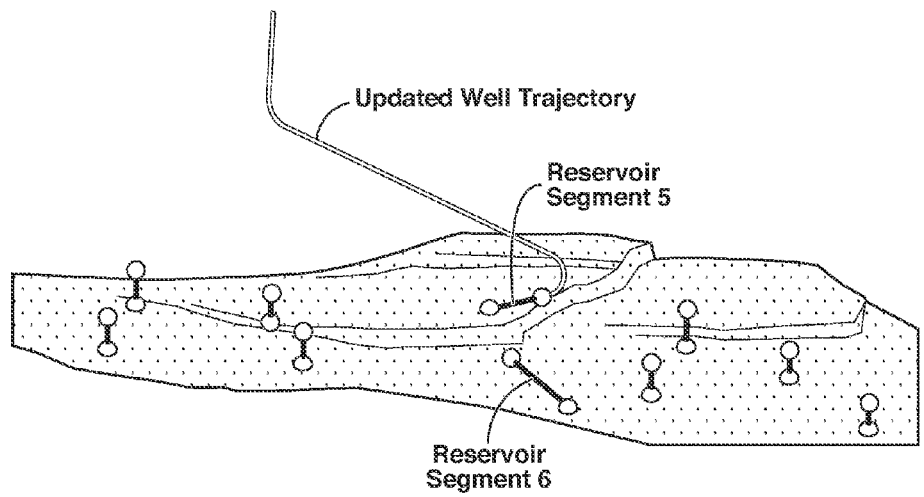
FIG. 21 is a non-limiting example of modifying reservoir segments to evaluate new well trajectories.

FIG. 21 further shows the effects of these changes to the resultant well trajectory if the well remained attached to the original drill center. In order to honor the inclination and azimuth of reservoir segment 5, not only does the dogleg severity need to increase, but also the total measured depth of the well. This modified well would likely be deemed too risky or too costly therefore in order to remedy the situation of an unacceptable well trajectory the field development plan would have to be modified. The present technological advancement allows the user several options to adjust the results. A purely manual process could be employed to modify the well targets, reservoir segments or top hole positions. Alternatively, the optimization process could be re-run based on the changes in the targets, segments, or top hole locations as well as varying the attribute or the weighting of the attributes used for the optimization (steps 1407-1409, for example). The advantages of using Dynamic Surface Grids not only makes the optimization much more efficient, but also allows the user to visually inspect or evaluate the processes in each one of the interim steps.

Figure 22:
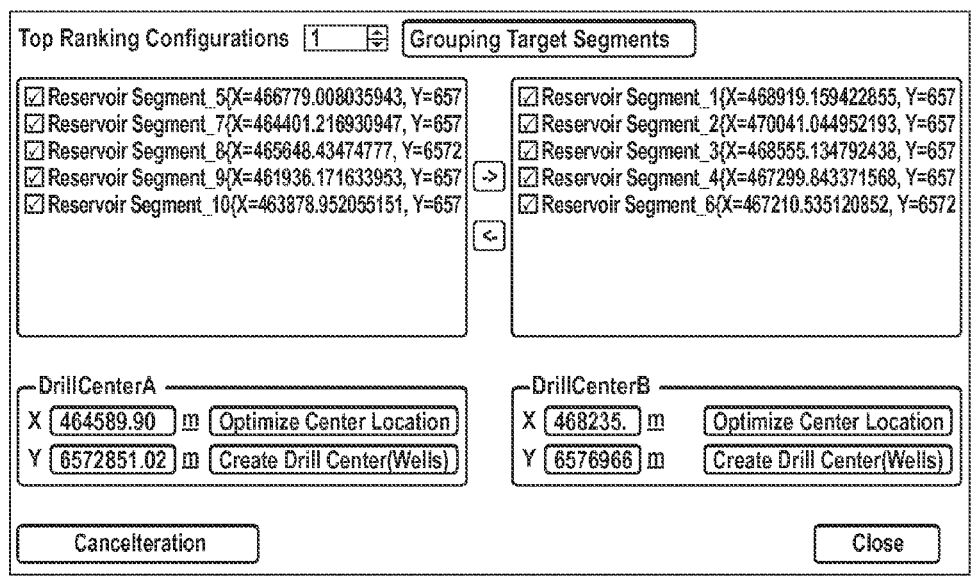
FIG. 22 is a non-limiting example of a graphical user to re-assign different segments/well paths to different drill centers in order to evaluate different scenarios.

FIG. 22 is a non-limiting example of a graphical user interfaced used to re-assign different segments/well paths to different drill centers in order to evaluate different scenarios. A user can adjust the drill center assignments to test different configurations. In some situations, this may be more desirable than re-running the optimization. In this example, however, the optimization was re-run. The new configuration of wells shows that reservoir segment 6 was moved to drill center B and reservoir segment 5 was moved to drill center A. Also, both drill center positions have changed from their position shown in FIG. 18. The newly optimized configuration is depicted in FIG. 23.

Figure 23:
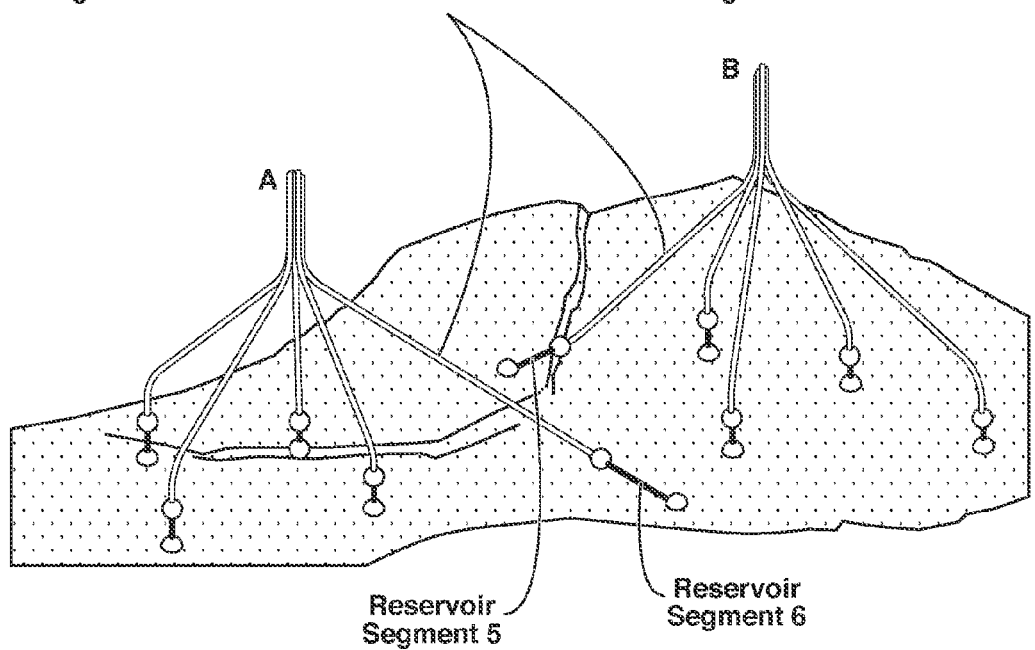
FIG. 23 is a non-limiting example two drill center locations determined as result of modification of reservoir segments.

The resulting optimized field planning configuration in FIG. 23 includes: a two well site configuration is shown in which well site assignment for reservoir segment 5 and 6 has been changed according. The optimization has swapped the drill center assignments for reservoir segments 5 and 6. Also notice that locations of the two well sites have also been shifted after the optimization was re-run.

In Step 1410 in FIG. 14, when an optimal drill center and well trajectory configuration is obtained, the user can define the specific requirements associated with that drill center (numbers of slots, drill center orientation, footprint etc.) and assign wells to specific slots.

In step 1412 in FIG. 14, one or more wells can be drilled based on the optimal drill center(s). Step 1412 can include managing hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 24:
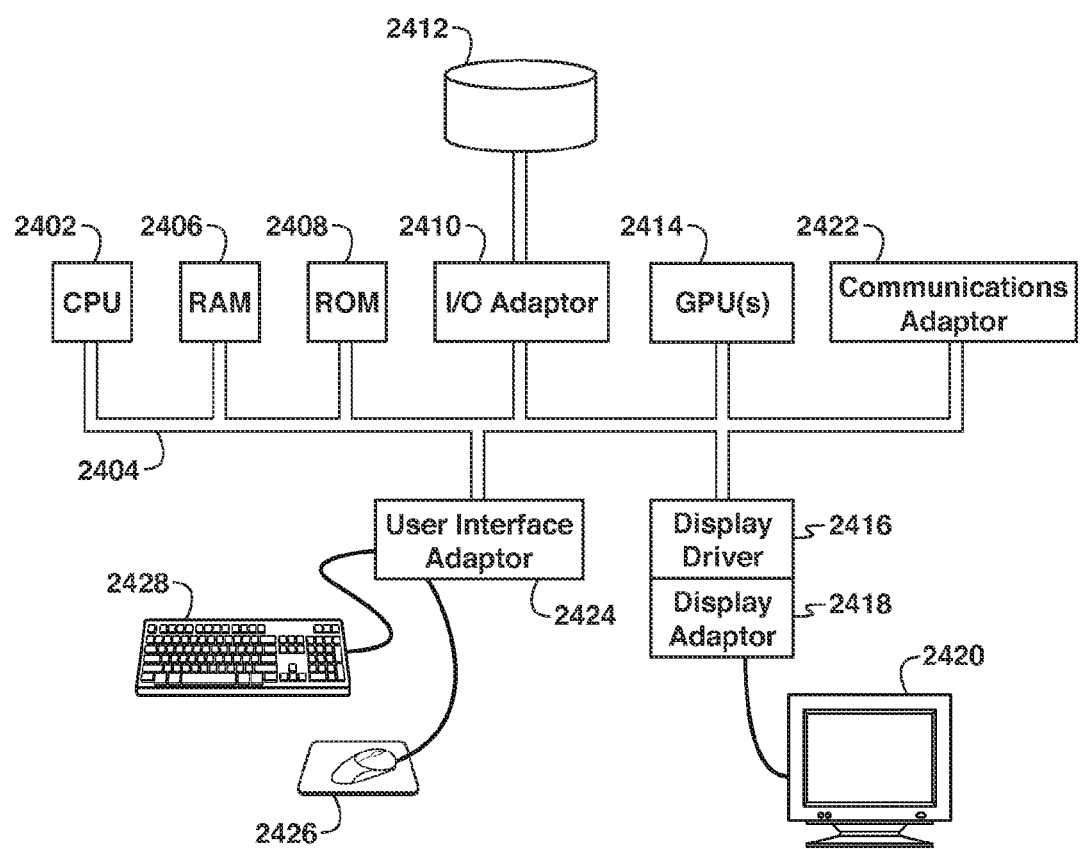
FIG. 24 is a non-limiting example of a computer useable with the present technological advancement.

FIG. 24 is a block diagram of a computer system 2400 that can be used to execute an the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402, (and other components of system 2100) supports the operations as described herein. Those of ordinary skill in the art will appreciate that, while only a single CPU 2102 is shown in FIG. 8, additional CPUs may be present. Moreover, the computer system 2400 may comprise a networked, multi-processor computer system that may include a hybrid parallel CPU/GPU system. The CPU 402 may execute the various logical instructions according to various teachings disclosed herein. For example, the CPU 2402 may execute machine-level instructions for performing processing according to the operational flow described.

The computer system 2400 may also include computer components such as non-transitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with an the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above). ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example.

However, the present techniques are not intended to be limited to the particular examples disclosed herein. Indeed, the present techniques include all alternatives, modifications, and equivalents falling within the spirit and scope of the appended claims.

What is claimed is:

1. A method, comprising:
identifying a well target or reservoir segment;
defining a dynamic surface grid in a computer system, the dynamic surface grid being a representation of a ground surface, sea-level, or subsea surface above a reservoir upon which a drill center is locatable, and the dynamic surface grid including a plurality of cells that define potential locations for the drill center;
creating a first attribute map with a first drilling or geologic attribute in combination with a first well target or reservoir segment;
creating a second attribute map with the first drilling or geologic attribute in combination with a second well target or reservoir segment in the reservoir;
creating a first composite attribute map by combining the first attribute map and the second attribute map;
assigning, to each of the plurality of cells of the dynamic surface grid in the computer system, a value of a drilling or geologic attribute from the first composite attribute map that defines a quality of a drill center position relative to the well target or reservoir segment;
selecting, based on a value of the drilling or geologic attribute, a location for the drill center corresponding to a location represented on the dynamic surface grid;
displaying the selected location for the drill center; and
causing a well to be drilled at the location of the drill center for the production of hydrocarbons.

2. The method of claim 1, wherein the drilling or geologic attribute is measured depth, and the method further comprises:
determining a well trajectory solution from each of the plurality of cells, which define potential locations for the drill center, to the well target or reservoir segment; and
calculating a measured depth of each of the well trajectory solutions, wherein the assigning includes assigning corresponding values of the measured depth to each of the plurality of cells that define potential locations for the drill center.

3. The method of claim 1, further comprising:
creating a composite attribute map from a combination of a first attribute map based on a first drilling or geologic attribute and a second attribute map based on a second drilling or geologic attribute, the first drilling or geologic attribute being different from the second drilling or geologic attribute.

4. The method of claim 3, further comprising:
adjusting at least one well target or reservoir segment;
refining only those cells of the dynamic surface grid affected by the adjusting; and
updating the composite attribute map based on the adjusting and refining.

5. The method of claim 1, further comprising, after the assigning and before the selecting:
identifying a region on the dynamic surface grid that is less than an entirety of the dynamic surface grid; and
creating a nested dynamic surface grid within the region, the nested dynamic grid having a grid spacing that is smaller than a grid spacing of the dynamic surface grid.

6. The method of claim 5, wherein the creating is automatically initiated.

7. The method of claim 5, wherein the creating is manually initiated.

8. The method of claim 5, further comprising, after the assigning and before the selecting:
determining a well trajectory solution from each of a plurality of cells within the nested dynamic surface grid, which define potential locations for the drill center, to the well target or reservoir segment; and
calculating the value for the drilling or geologic attribute of each of the well trajectory solutions, wherein the assigning includes assigning corresponding values of the drilling or geologic attribute to each of the plurality of cells within the nested dynamic surface grid that define potential locations for the drill center.

9. The method of claim 5, wherein the identifying includes comparing values of the drilling or geologic attribute assigned to the cells of the dynamic surface grid to a predetermined threshold.

10. The method of claim 1, further comprising, after the assigning and before the selecting, creating a composite grid with finer grid spacing than the dynamic surface grid.

11. The method of claim 1, wherein the drill center is an onshore pad, well site, offshore platform, drillship or rig, or subsea template.

12. The method of claim 1, wherein the drilling or geologic attribute is at least one of measured depth, accumulated dogleg severity, drilling difficulty index, cost, or reservoir preformation.

13. The method of claim 1, wherein the value of the drilling or geologic attribute is a monetized value.

14. The method of claim 1, wherein the selecting includes identifying at least two drill centers.

15. The method of claim 1, further comprising managing hydrocarbons from a well disposed at the drill center.

16. The method of claim 1, wherein the identifying includes identifying a plurality of well targets or reservoir segments, and the assigning includes assigning, to each of the plurality of cells of the dynamic surface grid, a value of a drilling or geologic attribute that defines a quality of a drill center position relative to each of the plurality of well targets or reservoir segments, and the method further comprises:
generating an attribute map for each of the well targets or reservoir segments; and
combining the attribute maps.

17. A non-transitory computer readable storage medium encoded with instructions, which when executed by a computer causes the computer to execute a method, comprising:
identifying a well target or reservoir segment;
defining a dynamic surface grid in a computer, the dynamic surface grid being a representation of a ground surface, sea-level, or subsea surface above the reservoir upon which a drill center is locatable, and the dynamic surface grid including a plurality of cells that define potential locations for the drill center;
creating a first attribute map with a first drilling or geologic attribute in combination with a first well target or reservoir segment;
creating a second attribute map with the first drilling or geologic attribute in combination with a second well target or reservoir segment in the reservoir;
creating a first composite attribute map by combining the first attribute map and the second attribute map;
assigning, to each of the plurality of cells of the dynamic surface grid in the computer, a value of a drilling or geologic attribute from the first composite attribute map that defines a quality of a drill center position relative to the well target or reservoir segment;

selecting, based on a value of the drilling or geologic attribute, a location for the drill center corresponding to a location represented on the dynamic surface grid; and displaying the selected location for the drill center; and causing a well to be drilled at the location of the drill center for the production of hydrocarbons.

18. An apparatus, comprising:

a memory device that stores executable instructions; and a processing circuit that executes the instructions to:

identify a well target or reservoir segment;

define a dynamic surface grid, the dynamic surface grid being a representation of a ground surface, sea-level, or subsea surface above the reservoir upon which a drill center is locatable, and the dynamic surface grid including a plurality of cells that define potential locations for the drill center;

create a first attribute map with a first drilling or geologic attribute in combination with a first well target or reservoir segment;

create a second attribute map with the first drilling or geologic attribute in combination with a second well target or reservoir segment in the reservoir;

create a first composite attribute map by combining the first attribute map and the second attribute map;

assign, to each of the plurality of cells of the dynamic surface grid, a value of a drilling or geologic attribute from the first composite attribute map that defines a quality of a drill center position relative to the well target or reservoir segment;

select, based on a value of the drilling or geologic attribute, a location for the drill center corresponding to a location represented on the dynamic surface grid; and display the selected location for the drill center; and causing a well to be drilled at the location of the drill center for the production of hydrocarbons.

19. A method, comprising:

identifying a well target or reservoir segment;

defining a dynamic surface grid, the dynamic surface grid being a representation of a ground surface, sea-level, or subsea surface above a reservoir upon which a drill center is locatable, and the dynamic surface grid including a plurality of cells that define potential locations for the drill center;

creating a composite attribute map from a combination of a first attribute map based on a first drilling or geologic attribute and a second attribute map based on a second drilling or geologic attribute, the first drilling or geologic attribute being different from the second drilling or geologic attribute;

assigning, to each of the plurality of cells of the dynamic surface grid, a value of a drilling or geologic attribute from the composite attribute map that defines a quality of a drill center position relative to the well target or reservoir segment;

selecting, based on a value of the drilling or geologic attribute, a location for the drill center corresponding to a location represented on the dynamic surface grid;

displaying the selected location for the drill center; and causing a well to be drilled at the location of the drill center for the production of hydrocarbons.

20. The method of claim 19, wherein the drilling or geologic attribute is measured depth, and the method further comprises:

determining a well trajectory solution from each of the plurality of cells, which define potential locations for the drill center, to the well target or reservoir segment; and calculating a measured depth of each of the well trajectory solutions, wherein the assigning includes assigning corresponding values of the measured depth to each of the plurality of cells that define potential locations for the drill center.

21. The method of claim 19, further comprising, after the assigning and before the selecting:

identifying a region on the dynamic surface grid that is less than an entirety of the dynamic surface grid; and creating a nested dynamic surface grid within the region, the nested dynamic grid having a grid spacing that is smaller than a grid spacing of the dynamic surface grid.

22. The method of claim 21, wherein the creating is automatically initiated.

23. The method of claim 21, wherein the creating is manually initiated.

24. The method of claim 21, further comprising, after the assigning and before the selecting:

determining a well trajectory solution from each of a plurality of cells within the nested dynamic surface grid, which define potential locations for the drill center, to the well target or reservoir segment; and calculating the value for the drilling or geologic attribute of each of the well trajectory solutions, wherein the assigning includes assigning corresponding values of the drilling or geologic attribute to each of the plurality of cells within the nested dynamic surface grid that define potential locations for the drill center.

25. The method of claim 21, wherein the identifying includes comparing values of the drilling or geologic attribute assigned to the cells of the dynamic surface grid to a predetermined threshold.

26. The method of claim 19, further comprising, after the assigning and before the selecting, creating a composite grid with finer grid spacing than the dynamic surface grid.

27. The method of claim 19, wherein the drill center is an onshore pad, well site, offshore platform, drillship or rig, or subsea template.

28. The method of claim 19, wherein the drilling or geologic attribute is at least one of measured depth, accumulated dogleg severity, drilling difficulty index, cost, or reservoir preformation.

29. The method of claim 19, wherein the value of the drilling or geologic attribute is a monetized value.

30. The method of claim 19, wherein the selecting includes identifying at least two drill centers.

31. The method of claim 19, further comprising managing hydrocarbons from a well disposed at the drill center.

32. The method of claim 19, further comprising:

adjusting at least one well target or reservoir segment;

refining only those cells of the dynamic surface grid affected by the adjusting; and updating the composite attribute map based on the adjusting and refining.

33. The method of claim 19, wherein the identifying includes identifying a plurality of well targets or reservoir segments, and the assigning includes assigning, to each of the plurality of cells of the dynamic surface grid, a value of a drilling or geologic attribute that defines a quality of a drill center position relative to each of the plurality of well targets or reservoir segments, and the method further comprises:

generating an attribute map for each of the well targets or reservoir segments; and combining the attribute maps.

34. A method, comprising:

identifying a well target or reservoir segment;

defining a dynamic surface grid, the dynamic surface grid being a representation of a ground surface, sea-level, or subsea surface above a reservoir upon which a drill center is locatable, and the dynamic surface grid including a plurality of cells that define potential locations for the drill center;

assigning, to each of the plurality of cells of the dynamic surface grid, a value of a drilling or geologic attribute that defines a quality of a drill center position relative to the well target or reservoir segment;

selecting, based on a value of the drilling or geologic attribute, a location for the drill center corresponding to a location represented on the dynamic surface grid;

displaying the selected location for the drill center;

causing a well to be drilled at the location for the drill center for the production of hydrocarbons; and wherein after the assigning and before the selecting:

identifying a region on the dynamic surface grid that is less than an entirety of the dynamic surface grid; and creating a nested dynamic surface grid within the region, the nested dynamic grid having a grid spacing that is smaller than a grid spacing of the dynamic surface grid; and causing a well to be drilled at the location of the drill center for the production of hydrocarbons.

35. The method of claim 34, wherein the drilling or geologic attribute is measured depth, and the method further comprises:

determining a well trajectory solution from each of the plurality of cells, which define potential locations for the drill center, to the well target or reservoir segment; and calculating a measured depth of each of the well trajectory solutions, wherein the assigning includes assigning corresponding values of the measured depth to each of the plurality of cells that define potential locations for the drill center.

36. The method of claim 34, wherein the creating is automatically initiated.

37. The method of claim 34, wherein the creating is manually initiated.

38. The method of claim 34, further comprising, after the assigning and before the selecting:

determining a well trajectory solution from each of a plurality of cells within the nested dynamic surface grid, which define potential locations for the drill center, to the well target or reservoir segment; and calculating the value for the drilling or geologic attribute of each of the well trajectory solutions, wherein the assigning includes assigning corresponding values of the drilling or geologic attribute to each of the plurality of cells within the nested dynamic surface grid that define potential locations for the drill center.

39. The method of claim 34, wherein the identifying includes comparing values of the drilling or geologic attribute assigned to the cells of the dynamic surface grid to a predetermined threshold.

40. The method of claim 34, further comprising, after the assigning and before the selecting, creating a composite grid with finer grid spacing than the dynamic surface grid.

41. The method of claim 34, wherein the drill center is an onshore pad, well site, offshore platform, drillship or rig, or subsea template.

42. The method of claim 34, wherein the drilling or geologic attribute is at least one of measured depth, accumulated dogleg severity, drilling difficulty index, cost, or reservoir preformation.

43. The method of claim 34, wherein the value of the drilling or geologic attribute is a monetized value.

44. The method of claim 34, wherein the selecting includes identifying at least two drill centers.

45. The method of claim 34, further comprising managing hydrocarbons from a well disposed at the drill center.

46. The method of claim 34, wherein the identifying includes identifying a plurality of well targets or reservoir segments, and the assigning includes assigning, to each of the plurality of cells of the dynamic surface grid, a value of a drilling or geologic attribute that defines a quality of a drill center position relative to each of the plurality of well targets or reservoir segments, and the method further comprises:

generating an attribute map for each of the well targets or reservoir segments; and combining the attribute maps.

\* \* \* \* \*